United States Patent
Kobayashi et al.

(10) Patent No.: US 9,704,180 B2
(45) Date of Patent: Jul. 11, 2017

(54) DISTRIBUTION DEVICE, TERMINAL DEVICE, DISTRIBUTION METHOD, AND NON-TRANSITORY COMPUTER READABLE STORAGE MEDIUM

(71) Applicant: YAHOO JAPAN CORPORATION, Tokyo (JP)

(72) Inventors: Daisuke Kobayashi, Tokyo (JP); Tatsuaki Suzuki, Tokyo (JP); Kensuke Takada, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 0 days.

(21) Appl. No.: 14/801,563

(22) Filed: Jul. 16, 2015

(65) Prior Publication Data

US 2016/0027060 A1  Jan. 28, 2016

(30) Foreign Application Priority Data

Jul. 22, 2014 (JP) ................. 2014-148826

(51) Int. Cl.
*G06Q 30/02* (2012.01)
*H04M 1/725* (2006.01)
(Continued)

(52) U.S. Cl.
CPC ....... *G06Q 30/0267* (2013.01); *G06F 3/0416* (2013.01); *G06F 3/0483* (2013.01);
(Continued)

(58) Field of Classification Search
CPC .......... G06Q 30/0277; G06Q 30/0269; G06Q 30/02; G06Q 30/0267; G06Q 30/0254; G06F 3/0416; G06F 3/0488
See application file for complete search history.

(56) References Cited

U.S. PATENT DOCUMENTS 6,169,538 B1 * 1/2001 Nowlan ................ G06F 3/0488
341/22
7,966,632 B1 * 6/2011 Pan .................... H04N 5/44543
725/45
(Continued)

FOREIGN PATENT DOCUMENTS

JP 2002-073863 A 3/2002
JP 2003-022042 A 1/2003
(Continued)

OTHER PUBLICATIONS

U.S. Appl. No. 62/011,531, filed Jun. 2014, Chaudhri, drw Ch.*
(Continued)

*Primary Examiner* — Luis A Brown
*Assistant Examiner* — Radu Andrei
(74) *Attorney, Agent, or Firm* — Oliff PLC

(57) ABSTRACT

A distribution device according to the present application includes a distribution unit. The distribution unit distributes control information to a terminal device. The control information causes the terminal device to execute a detection procedure of detecting a position where a moving operation to move first content being displayed by the terminal device has been performed, and a display procedure of superimposing and displaying second content on the first content, based on the position detected by the detection procedure. For example, the display procedure causes the terminal device to execute processing of displaying, as second content, advertising content that allows an access to a web page provided by an advertiser, when the advertising content is selected by a user of the terminal device.

11 Claims, 11 Drawing Sheets

(51) Int. Cl.

| | | |
|---|---|---|
| *G06T 11/60* | (2006.01) | |
| *G06F 3/0488* | (2013.01) | |
| *G06F 3/0483* | (2013.01) | |
| *G09G 5/14* | (2006.01) | |
| *H04L 29/06* | (2006.01) | |
| *G06F 17/30* | (2006.01) | |
| *H04N 5/445* | (2011.01) | |
| *G06F 3/041* | (2006.01) | |

(52) U.S. Cl.
CPC ........ *G06F 3/0488* (2013.01); *G06F 3/04883* (2013.01); *G06F 17/30781* (2013.01); *G06Q 30/02* (2013.01); *G06T 11/60* (2013.01); *G09G 5/14* (2013.01); *H04L 65/403* (2013.01); *H04M 1/72519* (2013.01); *H04N 5/44543* (2013.01)

(56) References Cited

U.S. PATENT DOCUMENTS

| | | | | |
|---|---|---|---|---|
| 8,220,022 | B1* | 7/2012 | Pan | H04N 5/44543 725/45 |
| 8,458,053 | B1* | 6/2013 | Buron | G06Q 30/06 705/14.4 |
| 8,555,177 | B1* | 10/2013 | Junee | H04L 65/403 715/719 |
| 8,566,315 | B1* | 10/2013 | Davtchev | G06F 17/30817 707/736 |
| 8,918,330 | B1* | 12/2014 | Winkler | G06Q 30/0254 705/14.16 |
| 9,063,638 | B1* | 6/2015 | Schrock | G06F 3/0484 |
| 2008/0276269 | A1* | 11/2008 | Miller | G06Q 30/02 725/34 |
| 2008/0276272 | A1* | 11/2008 | Rajaraman | G06Q 30/02 725/37 |
| 2009/0024923 | A1* | 1/2009 | Hartwig | G06F 17/30781 715/716 |
| 2009/0024927 | A1* | 1/2009 | Schrock | G06Q 30/02 715/722 |
| 2009/0297118 | A1* | 12/2009 | Fink | G06F 17/3082 386/278 |
| 2010/0010893 | A1* | 1/2010 | Rajaraman | G06Q 30/0253 705/14.51 |
| 2012/0166950 | A1* | 6/2012 | Frumar | G06F 3/04883 715/719 |
| 2012/0290933 | A1* | 11/2012 | Rajaraman | G06F 17/30817 715/719 |
| 2013/0100162 | A1* | 4/2013 | Iseri | G09G 5/14 345/629 |
| 2013/0166393 | A1* | 6/2013 | Lee | G06Q 30/0267 705/14.69 |
| 2015/0062052 | A1* | 3/2015 | Bernstein | G06F 3/0416 345/173 |
| 2015/0365306 | A1* | 12/2015 | Chaudhri | G06F 3/0416 715/736 |

FOREIGN PATENT DOCUMENTS

| | | |
|---|---|---|
| JP | 2010-526494 A | 7/2010 |
| JP | 2014-063102 A | 4/2014 |
| WO | 2008/137482 A1 | 11/2008 |

OTHER PUBLICATIONS

U.S. Appl. No. 62/011,531, filed Jun. 2014, Chaudhri, spec C.*
Maximilian Firtman, Practical j Query Mobile, Japan, O'Reilly Japan, Inc., O'Reilly Tim, Jan. 17, 2013, 1st Edition, p. 68 to 69.
Yuta Ohara, Monthly iPhone/iPod Newspaper, We solve your questions, Mac People, Japan, ASCII Mediaworks Inc., Jan. 1, 2010, vol. 16, No. 1, p. 171.
Feb. 2, 2016 Office Action issued in Japanese Patent Application No. 2014-148826.
Aug. 9, 2016 Office Action issued in Japanese Patent Application No. 2014-148826.
Masanori Okibayashi "11-2 Make elements draggable," "Create Ajax application by jQuery" Gijutsu-Hyohron Co., Ltd., Jul. 25, 2008, 1st Edition, pp. 234-241.

* cited by examiner

| ADVERTISER ID | ADVERTISING CONTENT | BIDDING PRICE | CTR |
|---|---|---|---|
| B10 | C10 (C11, C12, C20 DISPLAY INSTRUCTION) | 100 | 0.02 |
| | C30 | 50 | 0.01 |
| | ... | ... | ... |
| B20 | C40 | 100 | 0.01 |
| | ... | ... | ... |
| ... | ... | ... | ... |

DISTRIBUTION DEVICE, TERMINAL DEVICE, DISTRIBUTION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-148826 filed in Japan on Jul. 22, 2014.

BACKGROUND OF THE INVENTION

1. Field of the Invention

The present invention relates to a distribution device, a terminal device, a distribution method, and a non-transitory computer readable storage medium having stored therein a distribution program.

2. Description of the Related Art

In recent years, advertising distribution through the Internet has been actively performed. For example, advertising content related to a corporation, a product, and the like is displayed at a predetermined position on a web page. The advertising content is an icon of a still image, a moving image, or text data, and a hyperlink (hereinafter, simply described as "link") is provided to a web page provided by an advertiser (hereinafter, the web page is described as advertiser page). When the advertising content is clicked by a user, the advertiser page is displayed.

As a technology related to such advertising display, a technology of displaying information content in a first layer, and displaying advertising content in a second layer behind the information content has been proposed.

However, in the above-described conventional technology, improvement of an advertising effect of the content is difficult. To be specific, in the conventional technology of displaying the advertising content in the second layer, the advertising content is merely displayed behind the information content. Therefore, when the conventional technology is used, the advertising content is less easily recognized by the user, and an expected advertising effect may not be able to be exerted.

SUMMARY OF THE INVENTION

It is an object of the present invention to at least partially solve the problems in the conventional technology.

A distribution device according to the present application includes a distribution unit configured to distribute control information to a terminal device, and the control information causes the terminal device to execute a detection procedure of detecting a position where a moving operation to move first content being displayed by the terminal device has been performed, and a display procedure of superimposing and displaying second content on the first content, based on the position detected by the detection procedure.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments for implementing a distribution device, a terminal device, a distribution method, and a non-transitory computer readable storage medium having stored therein a distribution program according to the present application (hereinafter, the aforementioned embodiments are referred to as "embodiments") will be described in detail with reference to the drawings. Note that the distribution device, the terminal device, the distribution method, and the non-transitory computer readable storage medium having stored therein a distribution program according to the present application are not limited by the embodiments. Further, in each embodiment below, the same portion is denoted with the same reference sign, and overlapping description is omitted.

1. Display Processing

Figure 1:
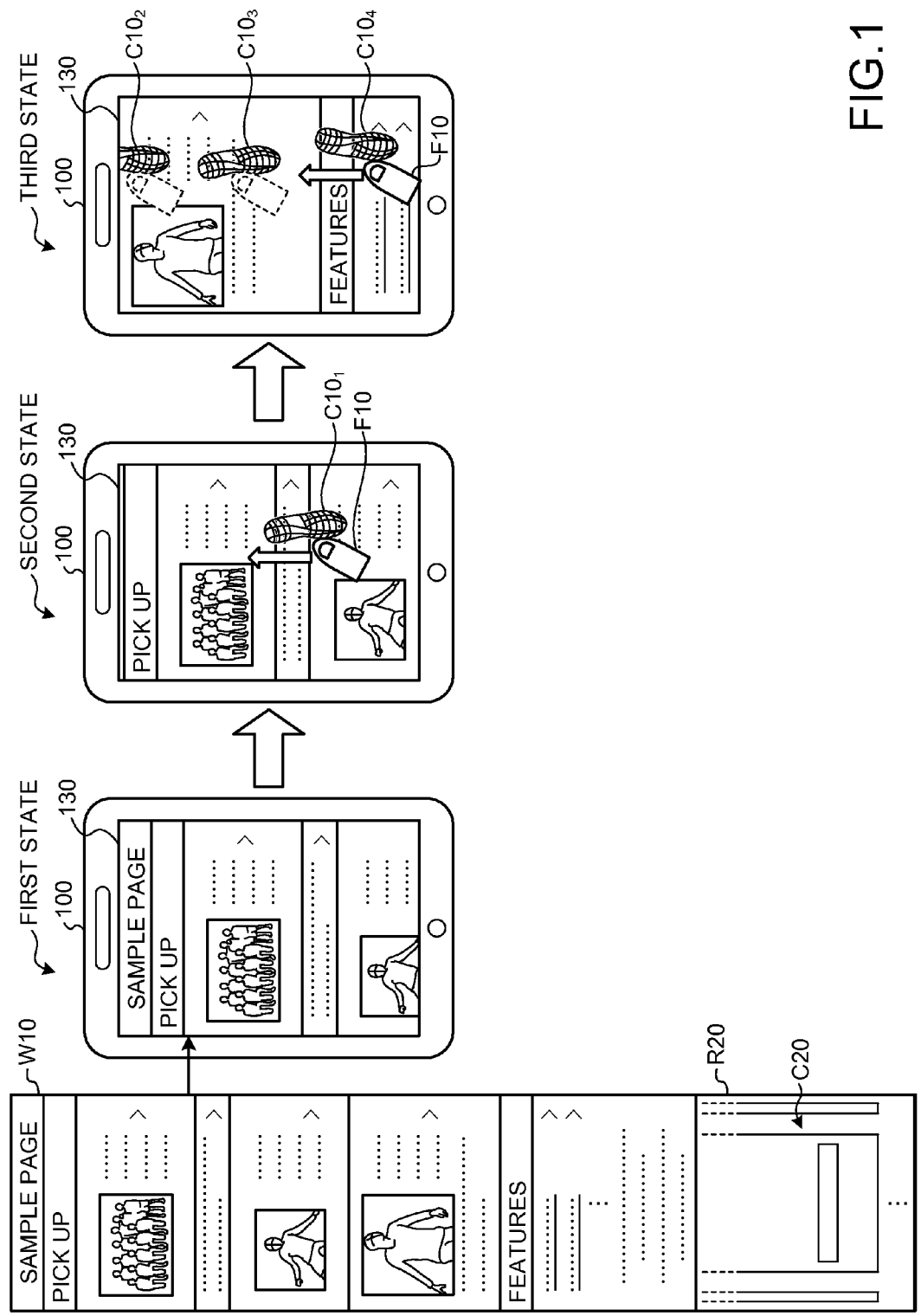
FIG. 1 is a diagram illustrating an example of display processing according to an embodiment.

First, an example of display processing according to an embodiment will be described using FIG. 1. FIG. 1 is a diagram illustrating an example of display processing according to an embodiment. FIG. 1 illustrates an example in which first content and second content are displayed by a terminal device 100. Note that, hereinafter, description will be given exemplarily using a web page as the first content and advertising content as the second content. Further, a plurality of pieces of advertising content $C10_1$ to $C10_n$ (n is an arbitrary number) may sometimes be described as advertising content C10.

The terminal device 100 illustrated in FIG. 1 is a mobile terminal device such as a smart phone. The terminal device 100 includes an output unit 130 such as a liquid crystal display. Note that a touch panel is employed in the terminal device 100. That is, a user of the terminal device 100 performs various operations by touching a display surface of the output unit 130 with a finger F10 or a dedicated pen.

A web page W10 is content for portal site where various types of information such as news are posted. On the web page W10, news topics are itemized under display such as "pick up" or "features". Each news topic corresponds to an anchor text that is linked to another web page. As illustrated in FIG. 1, each news topic may be displayed together with an image related to the topic.

Note that, in FIG. 1, the size of the web page W10 in a vertical direction is longer than a display size of the vertical direction on the output unit 130 of the terminal device 100. Therefore, only a region of the web page W10 positioned within the output unit 130 of the terminal device 100 is displayed on the output unit 130, and a region of the web page W10 positioned outside the output unit 130 is not displayed. In this case, the user performs an operation to slide the finger F10 on the output unit 130 to browse a portion of the web page W10, the portion being not displayed on the output unit 130, for example. Accordingly, the web page W10 is scrolled, and a lower portion having not been displayed on the output unit 130, of the web page W10, is displayed on the output unit 130. Further, the web page W10 includes, in a lower end portion, an advertising space R20 that is a display region of predetermined content. Then, predetermined third content C20 is displayed in the advertising space R20. The third content C20 will be described below in details.

As illustrated in FIG. 1, the terminal device 100 according to an embodiment performs processing of superimposing and displaying the advertising content C10 on the web page W10 when a scroll operation to move the web page W10 is performed by the user. Hereinafter, the display processing executed by the terminal device 100 will be described below using a state transition of the terminal device 100 illustrated in FIG. 1. Hereinafter, when a state transition of the terminal device 100 is illustrated, a display state of the terminal device 100 is described as first state, second state, . . . , or N-th state (N is an arbitrary number).

The first state of FIG. 1 illustrates a state in which the terminal device 100 displays the web page W10 on the output unit 130. Note that the terminal device 100 cannot display the entire web page W10, and thus in an initial state, the web page W10 is displayed from a head thereof.

The user performs the scroll operation with the finger F10 in order to display the lower portion of the web page W10, which is not displayed in the first state on the output unit 130. The second state of FIG. 1 indicates a state immediately after the user performs an operation to flick (so-called flick operation) the web page W10 in a predetermined direction (in an up direction in the example of FIG. 1) after touching the web page W10 with the finger F10. In this case, the typical terminal device 100 that employs a touch panel scrolls the web page W10 by a predetermined distance (called inertial scrolling or the like) even after the finger F10 is separated from the web page W10. For example, the terminal device 100 automatically scrolls the web page W10 by a distance according to speed at which the user flicks the display surface.

At this time, the terminal device 100 moves the web page W10 according to the scroll operation, and displays advertising content $C10_1$ at a position where the scroll operation has been performed on the web page W10. The position where the scroll operation has been performed on the web page W10 is a position on the output unit 130 touched by the finger F10 of the user when the user performs the flick operation. That is, the terminal device 100 detects a touch operation to the output unit 130 by the finger F10, and displays the advertising content $C10_1$ at the detected position.

The advertising content $C10_1$ is a still image that mimics a footprint of a sports shoe, for example, and is provided by an advertiser who develops a sporting good business, for example. Then, assume that the advertising content $C10_1$ has a characteristic as a design of a sole of a shoe, and is widely known as a design that evokes the advertiser. That is, the advertising content $C10_1$ has an identification function that can distinguish the advertiser who provides the advertising content $C10_1$ from other advertisers. Therefore, general users can identify the advertiser from the advertising content $C10_1$. Further, a link to a web page provided by the advertiser (hereinafter, the web page is described as advertiser page) is provided in the advertising content $C10_1$. That is, when the advertising content $C10_1$ is selected by the user (for example, when the advertising content $C10_1$ is clicked, or touched with the finger F10), the terminal device 100 accesses the advertiser page.

After the second state of FIG. 1, the user repeatedly performs the scroll operation to further move the web page W10. The third state of FIG. 1 illustrates a state of the terminal device 100 to which the scroll operation has been repeatedly performed by the user. As illustrated in the third state of FIG. 1, the terminal device 100 sequentially displays the pieces of advertising content $C10_2$, $C10_3$, and $C10_4$ respectively at positions where the user has repeatedly performed the scroll operation. The pieces of advertising content $C10_2$, $C10_3$, and $C10_4$ are images having the same design as the advertising content $C10_1$. Note that the pieces of advertising content $C10_1$ to $C10_4$ are horizontally flipped and displayed every time. That is, the terminal device 100 displays the pieces of advertising content $C10_2$ to $C10_4$ likened to the footprints downwardly moved on the web page W10, as illustrated in the third state of FIG. 1.

As described above, the terminal device 100 according to an embodiment detects the scroll operation to move the web page W10 by the user, and displays the advertising content $C10_1$ to $C10_4$ in accordance with the detected positions of the scroll operation. Accordingly, the user visually recognizes the advertising content $C10_1$ to $C10_4$ every time scrolling the web page W10.

Typically, the web page distributed to the terminal device 100 such as a smart phone includes advertising content such as banner advertising. However, the output unit 130 included in the terminal device 100 such as a smart phone is smaller than a television monitor or the like. Therefore, the advertising content such as the banner advertising displayed on the output unit 130 of the terminal device 100 is less easily recognized by the user, and improvement of the advertising effect is difficult. Meanwhile, if the advertising content is displayed to occupy most part of the web page, content such as an article posted to the web page can be less easily browsed by the user. Therefore, usability may be deteriorated.

Meanwhile, the terminal device 100 according to an embodiment displays the advertising content C10 at a detected position, when having detected the scroll operation of the web page W10 from the user, as described above. That is, according to the terminal device 100 according to an embodiment, the advertising content C10 can be displayed at a position of a fingertip that can be easily focused by the user in the scroll operation. Therefore, the advertising content C10 can attract attention of the user. Accordingly, the terminal device 100 according to an embodiment can improve the advertising effect of the advertising content C10, compared with a case where the advertising content C10 is displayed as banner advertising or the like. Further, the terminal device 100 according to an embodiment can attract more attention to the advertising content C10, by providing unexpectedness to the user. Typically, the user does not expect that new content is displayed on the web page W10 in conjunction with the scroll operation. The terminal device 100 according to an embodiment displays the advertising content C10 at timing not expected by the user, and thus can provide unexpectedness to the user. Therefore, the user can easily pay attention to the web page W10 and the advertising content C10. As described above, the terminal device 100 according to an embodiment can instill the advertiser evoked from the advertising content C10 to the user, and thus can improve the advertising effect of the advertising content C10. Further, the terminal device 100 according to an embodiment superimposes and displays the advertising content C10 on the web page W10, and thus can strongly impress the advertising content C10 on the user. To be specific, the terminal device 100 can increase a possibility to cause the advertising content C10 to come into user's field of vision, who browses the web page W10, by superimposing and displaying the advertising content C10 on the web page W10. Therefore, the terminal device 100 can improve the advertising effect of the advertising content C10.

Although description has been omitted, the terminal device 100 can realize the above-described processing by an arbitrary technique. For example, the terminal device 100 may realize the above-described processing by downloading an application that causes the terminal device 100 to execute the display of the web page W10 and the display processing in advance, and executing the application at arbitrary timing. Further, the terminal device 100 receives distribution of control information that causes the terminal device 100 to execute the display processing, at the same time as distribution of the web page W10 and the advertising content C10. The terminal device 100 then performs the above-described performance processing according to the control information. Hereinafter, the terminal device 100 and the like that execute the display processing according to such control information will be described.

2. Configuration of Advertising Distribution System

Figure 2:
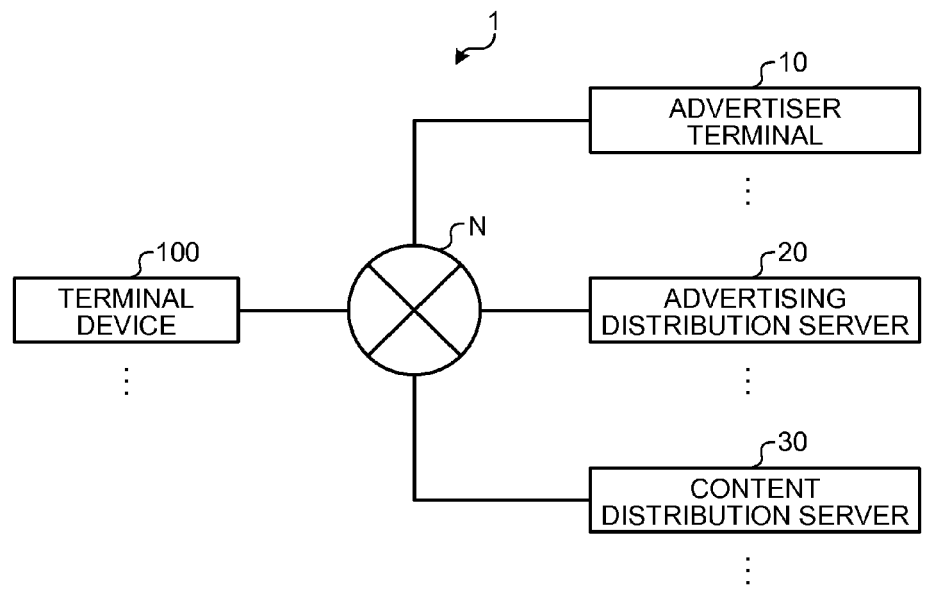
FIG. 2 is a diagram illustrating a configuration example of an advertising distribution system according to an embodiment.

Hereinafter, the terminal device 100 and the like that realize the above-described display processing will be described. First, a configuration of an advertising distribution system 1 according to an embodiment will be described using FIG. 2. FIG. 2 is a diagram illustrating a configuration example of an advertising distribution system according to an embodiment. As illustrated in FIG. 2, the advertising distribution system 1 includes the terminal device 100, an advertiser terminal 10, an advertising distribution server 20, and a content distribution server 30. The terminal device 100, the advertiser terminal 10, the advertising distribution server 20, and the content distribution server 30 are communicatively connected by wired or wireless means through a network N. Note that the advertising distribution system 1 illustrated in FIG. 2 may include a plurality of the terminal devices 100, a plurality of the advertiser terminals 10, a plurality of the advertising distribution servers 20, and a plurality of the content distribution servers 30.

The terminal device 100 is an information processing device used by the user who browses a web page. For example, the terminal device 100 is a mobile phone such as a smart phone, a tablet terminal, a personal digital assistant (PDA), a desktop-type personal computer (PC), a note-type PC, or the like. For example, the terminal device 100 acquires the web page W10 from the content distribution server 30 according to an operation by the user, and displays the acquired web page W10. Further, when an advertising acquisition command described below is included in the web page W10, the terminal device 100 acquires the advertising content C10 from the advertising distribution server 20, and displays the acquired advertising content C10 together with the web page W10 according to an operation of the user.

The advertiser terminal 10 is an information processing device used by the advertiser. For example, the advertiser terminal 10 is a desktop-type PC, a note-type PC, a tablet terminal, a mobile phone, a PDA, or the like. The advertiser terminal 10 submits advertising content to the advertising distribution server 20 according to an operation of the advertiser. For example, the advertiser terminal 10 submits a still image, a moving image, text data, a uniform resource locator (URL) for acquiring content corresponding to the advertising content, or the like to the advertising distribution server 20, as the advertising content.

Note that the advertiser may sometimes request an agency to submit the advertising content. In this case, the agent submits the advertising content to the advertising distribution server 20. Hereinafter, the description "advertiser" is a concept including not only the advertiser but also the agency, and the description "advertiser terminal" is a concept including not only the advertiser terminal 10 but also an agency device used by the agency.

The advertising distribution server 20 is a server device corresponding to a distribution device according to the present application, and is a server device that distributes the advertising content submitted by the advertiser terminal 10. For example, when having received an access from the terminal device 100, the advertising distribution server 20 performs matching of advertising according to a place of the terminal device 100, an attribute of the user, and the like, and distributes the advertising content that is an object to be distributed, as a result of the matching, to the terminal device 100. Further, the advertising distribution server 20 distributes control information that instructs a display form of the advertising content as the object to be distributed, to the terminal device 100 together with the advertising content. The control information is described in a script language such as Javascript (registered trademark) or a cascading style sheets (CSS).

The content distribution server 30 is a web server or the like that distributes a web page to the terminal device 100. For example, the content distribution server 30 distributes, to the terminal device 100, a web page including various types of information related to a portal site, a news site, an auction site, a weather forecast site, a shopping site, a finance (stock price) site, a route search site, a map providing site, a travel site, a restaurant introducing site, and a web blog.

Here, the web page W10 distributed by the content distribution server 30 is formed in an HTML file described in a hypertext markup language (HTML), an XML file described in an extensible markup language (XML), or the like. Further, the web page W10 distributed by the content distribution server 30 includes the advertising acquisition command. For example, in the HTML file or the like that forms the web page W10, a URL of the advertising distribution server 20 or the like is described as the advertising acquisition command. In this case, the terminal device 100 acquires the advertising content from the advertising distribution server 20 by accessing the URL described in the HTML file or the like.

Note that, in reality, various data distributed from the content distribution server 30 to the terminal device 100 are HTML files, images, and the like that form the web page. However, hereinafter, the various data distributed from the content distribution server 30 to the terminal device 100 may sometimes be described as "content".

3. Configuration of Advertising Distribution Server

Figure 3:
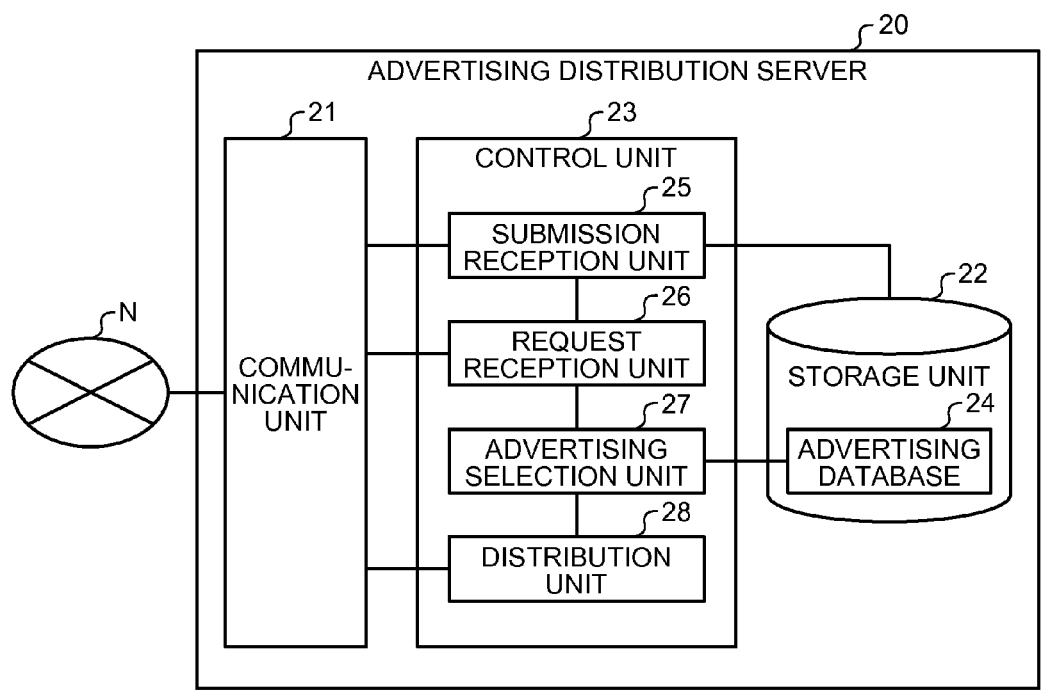
FIG. 3 is a diagram illustrating a configuration example of an advertising distribution server according to an embodiment.

Next, a configuration of the advertising distribution server 20 according to an embodiment will be described using FIG. 3. FIG. 3 is a diagram illustrating a configuration example of an advertising distribution server according to an embodiment. As illustrated in FIG. 3, the advertising distribution server 20 includes a communication unit 21, a storage unit 22, and a control unit 23.

The communication unit 21 is realized by, for example, a network interface card (NIC). The communication unit 21 is then connected with the network N by wired or wireless means, and transmits/receives information to/from the terminal device 100, the advertiser terminal 10, or the content distribution server 30.

The storage unit 22 is realized by a semiconductor memory element such as a random access memory (RAM) or a flash memory, or a storage device such as a hard disk or an optical disk. Further, the storage unit 22 stores an advertising database 24 that is a database in which the various types of information related to the advertising content submitted by the advertiser terminal 10 are stored.

Figures 4, 5:
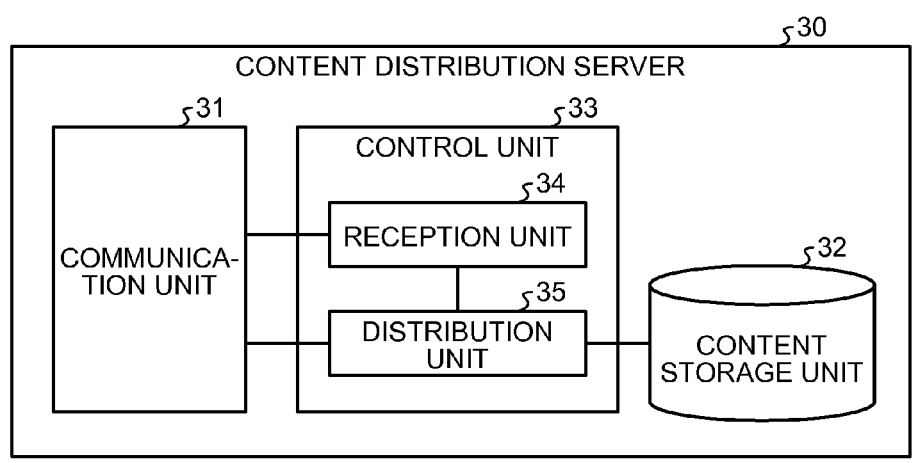
FIG. 4 is a diagram illustrating an example of an advertising database according to an embodiment.
FIG. 5 is a diagram illustrating a configuration example of a content distribution server according to an embodiment.

Here, FIG. 4 is a diagram illustrating an example of information stored in an advertising database according to an embodiment. In the example illustrated in FIG. 4, the advertising database 24 includes items such as an "advertiser ID", "advertising content", "bidding price", and "click through rate (CTR)".

The "advertiser ID" indicates identification information for identifying the advertiser or the advertiser terminal 10. The "advertising content" indicates the advertising content submitted by the advertiser terminal 10. FIG. 4 illustrates an example in which conceptual information such as "C10" and "C20" is stored in the "advertising content". However, in practice, a still image, a moving image, text data, an URL, or a file pass name that indicates a storage location of the aforementioned image or data is stored. Although details will be described below, pieces of advertising content C11, C12, and C20, which are to be displayed on the web page W10 in association with the advertising content C10, may sometimes be submitted together with the advertising content C10 by the same advertiser. In this case, in the "advertising content", the plurality of pieces of advertising content submitted by the advertiser is displayed. Further, in the "advertising content", a display instruction that instructs how to display each piece of advertising content may be registered as the advertising content to be displayed on the web page.

The "bidding price" indicates an advertising fee specified by the advertiser when the advertiser submits the advertising content. For example, the "bidding price" corresponds to a unit price paid by the advertiser to an advertising distributor (for example, an administrator of the advertising distribution server 20 or the content distribution server 30) when the advertising content is displayed on the web page once. Note that, for example, the "bidding price" may be a price corresponding to a unit price paid by the advertiser to the advertising distributor when the advertising content is clicked by the user once.

The "CTR" indicates a value obtained by dividing the number of times of clicking the advertising content by the number of times of displaying the advertising content. Note that, for the CTR of the advertising content that has never been distributed to the terminal device 100, a fixed value determined in advance, an average value of the CTRs in all pieces of advertising content, or an average value of the CTRs in all pieces of advertising content belonging to the same advertising category (for example, vehicle or travel) is stored. Further, in the "CTR", a prediction CTR predicted from a prediction model of CTR or the like may be stored. Such a prediction CTR is predicted with a type of the advertising content, a type of the web page on which the advertising content is displayed, or the like.

That is, FIG. 4 illustrates an example in which the advertiser identified with the advertiser ID "B10" specifies the bidding price "100", and has submitted the advertising content "C10, C11, C12, and C20". Further, FIG. 4 illustrates an example in which the CTR of the advertising content "C10, C11, C12, and C20" is "0.02". Further, FIG. 4 illustrates that the display instruction that instructs how to display each piece of advertising content is registered for the advertising content "C10, C11, C12, and C20" according to a user operation.

Referring back to FIG. 3 and description will be continued. The control unit 23 is realized such that a central processing unit (CPU), a micro processing unit (MPU), or the like executes various programs stored in the storage device in the advertising distribution server 20, using a RAM as a work area. Further, the control unit 23 is realized by an integrated circuit such as an application specific integrated circuit (ASIC), a field programmable gate array (FPGA), or the like.

As illustrated in FIG. 3, the control unit 23 includes a submission reception unit 25, a request reception unit 26, an advertising selection unit 27, and a distribution unit 28, and realizes or executes functions and effects of information processing described below. Note that an internal configuration of the control unit 23 is not limited to the configuration illustrated in FIG. 3, and another configuration may be employed as long as the configuration performs the information processing described below. Further, a connection relationship of the processing units included in the control unit 23 is not limited to the connection relationship illustrated in FIG. 3, and another connection relationship may be employed.

The submission reception unit 25 receives submission of the advertising content from the advertiser terminal 10. To be specific, the submission reception unit 25 according to an embodiment receives submission of the advertising content C10, C11, C12, and C20 together with specification of the bidding price. Further, the submission reception unit 25 may receive the display instruction that instructs display of each piece of advertising content on the web page W10, by executing the above-described display processing when having received the advertising content C10, C11, C12, and C20 and detected an operation to the terminal device 100. In such a case, the submission reception unit 25 registers the advertising content and the display instruction to the advertising database 24 together with the advertiser ID and the received bidding price.

Note that the submission reception unit 25 receives URLs that indicate respective landing pages or the like set to the advertising content C10, C11, and C12 from the advertiser terminal 10 in submission of the advertising content. The submission reception unit 25 then registers the received URLs that indicate the landing pages or the like to the advertising database 24 together with the advertising content C10, C11, and C12.

The request reception unit 26 receives an acquisition request of the advertising content from the terminal device 100. For example, the request reception unit 26 receives an HTTP request, as the acquisition request of the advertising content.

The advertising selection unit 27 selects distribution-candidate advertising content from the advertising database 24 when the acquisition request of the advertising content has been received by the request reception unit 26. For example, the advertising selection unit 27 performs matching of the advertising content that is to be the object to be distributed, from among the pieces of advertising content registered in the advertising database 24, based on the position of the terminal device 100 and an attribute of the user. In the matching, advertising content having a high bidding price or a high CTR, or advertising content having a high bidding price and a high CTR may be preferentially selected. Then, the advertising selection unit 27 outputs the advertising content selected as the object to be distributed to the distribution unit 28.

Note that, when the web page is a search page, the advertising selection unit 27 may use an advertising distribution technique called search-based advertising that extracts advertising content matched with a specified search keyword, for the search page. Further, the advertising selection unit 27 may use an advertising distribution technique called targeting distribution that extracts advertising content matched with attribute information (a psychographic attribute, a demographic attribute, or the like) of the user The distribution unit 28 distributes the control information to the terminal device 100 together with the advertising content selected by the advertising selection unit 27. To be specific, when having received the advertising content selected by the advertising selection unit 27, the distribution unit 28 extracts the display instruction included in the received advertising content. The distribution unit 28 then generates the control information for displaying the advertising content in a display form indicated by the extracted display instruction.

To be specific, the distribution unit 28 according to an embodiment generates the control information that causes the terminal device 100 to execute detection processing of detecting an operation to move the web page W10 being displayed in the terminal device 100, and a display procedure of superimposing and displaying the advertising content C10 on the web page W10, based on the position where the moving operation has been detected.

Further, the distribution unit 28 generates the control information for causing the terminal device 100 to execute processing below, when the URLs of the landing pages or the like set to the advertising content C10, C11, and C12 are registered in the advertising database 24. For example, the distribution unit 28 sets links to the URLs corresponding to the advertising content C10, C11, and C12. When the user selects the advertising content C10, C11, and C12, the distribution unit 28 generates the control information for causing the terminal device 100 to execute processing of displaying the landing pages or the like indicated by the corresponding URLs. Following that, the distribution unit 28 distributes the generated control information, the data of the image or the like included in the advertising content C10, C11, and C12, to the terminal device 100.

4. Configuration of Content Distribution Server

Next, a configuration of the content distribution server 30 according to an embodiment will be described using FIG. 5. FIG. 5 is a diagram illustrating a configuration example of the content distribution server 30 according to an embodiment. As illustrated in FIG. 5, the content distribution server 30 includes a communication unit 31, a content storage unit 32, and a control unit 33.

The communication unit 31 is realized by an NIC or the like. The communication unit 31 is connected with the network N by wired or wireless means, and transmits/receives information to/from the terminal device 100 or the advertising distribution server 20.

The content storage unit 32 is realized by, for example, a semiconductor memory element such as a RAM or a flash memory, or a storage device such as a hard disk or an optical disk. The content storage unit 32 stores the web page that is an example of content. For example, the content storage unit 32 stores an HTML file that forms the web page, a still image or a moving image displayed on the web page. Note that the advertising acquisition command for acquiring the advertising content to be displayed on the web page may be included in the web page stored in the content storage unit 32.

The control unit 33 is realized such that a CPU, an MPU, or the like executes various programs (corresponding to examples of a distribution program) stored in the storage device in the content distribution server 30, using a RAM as a work area. Further, the control unit 33 is realized by an integrated circuit such as an ASIC or an FPGA.

As illustrated in FIG. 5, the control unit 33 includes a reception unit 34 and a distribution unit 35, and realizes or executes functions and effects of information processing described below. Note that an internal configuration of the control unit 33 is not limited to the configuration illustrated in FIG. 5, and another configuration may be employed as long as the configuration performs the information processing described below. Further, a connection relationship of the processing units included in the control unit 33 is not limited to the connection relationship illustrated in FIG. 5, and another connection relationship may be employed.

The reception unit 34 receives an acquisition request of the web page from the terminal device 100. For example, the reception unit 34 receives an HTTP request, as the acquisition request of the web page.

The distribution unit 35 distributes the web page to the terminal device 100 when the acquisition request of the web page has been received by the reception unit 34. To be specific, the distribution unit 35 acquires the web page that is an object of the acquisition request from the content storage unit 32, and distributes the acquired web page to the terminal device 100. As described above, the web page stored in the content storage unit 32 includes the advertising acquisition command. That is, the terminal device 100 transmits a distribution request of the advertising content to the advertising distribution server 20 according to the advertising acquisition command included in the web page, when displaying the acquired web page.

5. Configuration of Terminal Device

Figure 6:
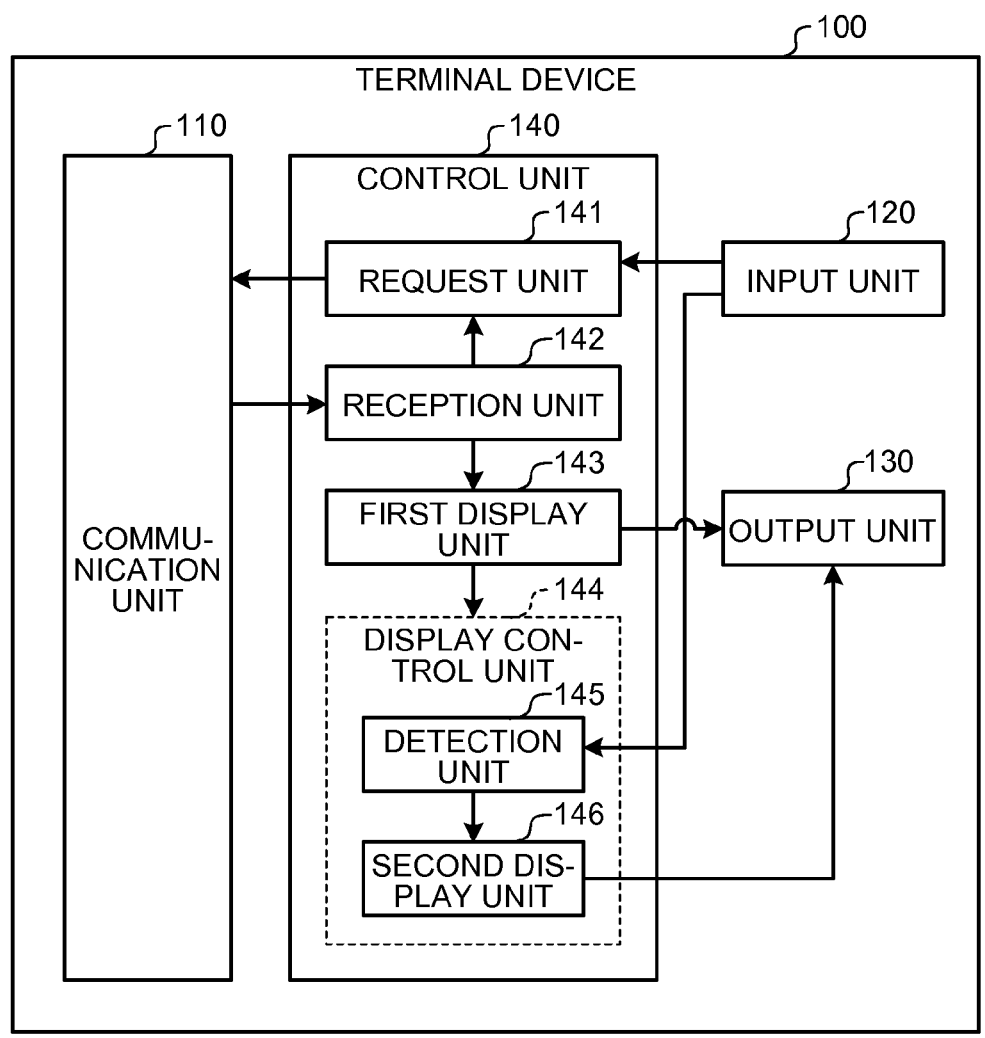
FIG. 6 is a diagram illustrating a configuration example of a terminal device according to an embodiment.

Next, a configuration of the terminal device 100 according to an embodiment will be described using FIG. 6. FIG. 6 is a diagram illustrating a configuration example of the terminal device 100 according to an embodiment. As illustrated in FIG. 6, the terminal device 100 includes a communication unit 110, an input unit 120, an output unit 130, and a control unit 140.

The communication unit 110 is realized by an NIC or the like. The communication unit 110 is then connected with the network N by wired or wireless means, and transmits/receives information to/from the advertising distribution server 20 or the content distribution server 30.

The input unit 120 is an input device that receives various operations from the user. For example, the input unit 120 is realized by a keyboard, a mouse, an operation key, or the like. The output unit 130 is a display device for displaying various types of information. For example, the output unit 130 is realized by a liquid crystal display or the like. Note that, when a touch panel is employed as the terminal device 100, the input unit 120 and the output unit 130 are integrated. Note that the example of FIG. 1 has illustrated an example in which the output unit 130 and the display region of the web page W10 in the terminal device 100 are the same. However, in practice, the web page W10 is not necessarily displayed on the entire surface of the output unit 130. That is, the content of the web page W10 or the like may be displayed in a window of web browser software displayed on the output unit 130. In this case, the display region in the terminal device 100 in displaying the web page W10 means the window of the web browser software.

The control unit 140 is realized such that a CPU, an MPU, or the like executes various programs (corresponding to examples of a display program) stored in the storage device in the terminal device 100, using a RAM as a work area, for example. For example, the various programs correspond to application programs called web browser. Further, the control unit 140 is realized by an integrated circuit such as an ASIC or an FPGA.

As illustrated in FIG. 6, the control unit 140 includes a request unit 141, a reception unit 142, a first display unit 143, and a display control unit 144, and realizes or executes functions and effects of information processing described below. Note that an internal configuration of the control unit 140 is not limited to the configuration illustrated in FIG. 6, and may be another configuration as long as the configuration performs the information processing described below. Further, a connection relationship of the processing units included in the control unit 140 is not limited to the connection relationship illustrated in FIG. 6, and may be another connection relationship.

The request unit 141 transmits the acquisition request of the web page to the content distribution server 30 according to a user operation received through the input unit 120. Further, when the advertising acquisition command is included in the web page received by the reception unit 142, the request unit 141 transmits the acquisition request of the advertising content to the advertising distribution server 20.

The reception unit 142 receives the web page and the advertising content. To be specific, the reception unit 142 receives the web page from the content distribution server 30 in response to the acquisition request of the web page transmitted by the request unit 141. At this time, when the advertising acquisition command is included in the web page, the reception unit 142 instructs the request unit 141 to transmit an acquisition request of the advertising content. The reception unit 142 then receives the advertising content from the advertising distribution server 20 in response to the acquisition request of the advertising content transmitted by the request unit 141. At this time, the reception unit 142 receives the control information that controls display of the advertising content together with the advertising content.

The first display unit 143 displays the content on the output unit 130. To be specific, when having received the web page W10 as a result of processing by the request unit 141, the first display unit 143 displays the web page W10 on the output unit 130.

The display control unit 144 controls display of predetermined content on the output unit 130 according to the control information included in the web page received by the reception unit 142. To be specific, the display control unit 144 executes processing of superimposing and displaying predetermined advertising content on the web page displayed on the output unit 130 by the first display unit 143. The display control unit 144 includes, as illustrated in FIG. 6, a detection unit 145 and a second display unit 146. The detection unit 145 and the second display unit 146 are realized such that a CPU, an MPU, or the like executes the control information included in the web page, using a RAM as a work area, for example. That is, processing executed by the detection unit 145 is realized by a detection procedure executed by the control information included in the advertising content, and processing executed by the second display unit 146 is realized by a display procedure executed by the control information included in the advertising content.

The detection unit 145 detects a predetermined operation to the terminal device 100. To be specific, the detection unit 145 according to an embodiment detects the scroll operation to move the web page W10 displayed on the output unit 130, as an example of the predetermined operation. Further, in detecting the scroll operation of the web page W10, the detection unit 145 detects a position on the web page W10 where the scroll operation has been performed by the user.

The second display unit 146 superimposes and displays new predetermined content on the web page displayed on the output unit 130. To be specific, the second display unit 146 according to an embodiment superimposes and displays the advertising content C10 on the web page W10, based on the position detected by the detection unit 145. For example, the second display unit 146 superimposes and displays the advertising content C10 on the web page W10, at the position on the web page W10 detected by the detection unit 145, and where the scroll operation of the user has been performed.

Further, the second display unit 146 displays advertising content that is to be superimposed on the web page, and allows an access to predetermined content corresponding to the advertising content when the advertising content is selected by the user of the terminal device 100. To be specific, the second display unit 146 according to an embodiment displays the advertising content C10 linked to the advertiser page as an example of the predetermined content. That is, the user causes the advertiser page as a link destination to be displayed in the terminal device 100, by selecting the advertising content C10 displayed on the web page W10. In this way, the terminal device 100 can provide the user with an incentive to access the landing page such as the advertiser page, by displaying the linked advertising content C10.

Further, when the detection unit 145 has detected a new scroll operation after the second display unit 146 displays the advertising content, the second display unit 146 displays new advertising content while keeping display of the displayed advertising content. In the example of FIG. 1, when having received the scroll operation from the user after displaying the advertising content $C10_1$ on the web page W10, the second display unit 146 displays the advertising content $C10_2$ while keeping display of the advertising content $C10_1$. In this way, the terminal device 100 can simultaneously display a plurality of pieces of advertising content C10. That is, the terminal device 100 can allow the user to recognize more advertising content C10 than a case of displaying only one piece of advertising content C10 on the web page W10. Therefore, improvement of the advertising effect can be expected. Note that, as described below, the terminal device 100 can also display only one piece of advertising content C10 without displaying the plurality of pieces of advertising content C10 not to decrease visibility of the web page W10.

Further, the second display unit 146 superimposes and displays advertising content having relevancy to the web page, as the advertising content, on the web page. In the example of FIG. 1, the second display unit 146 displays the advertising content C10 that includes a still image that mimics a footprint of a sports shoe, as the content having relevancy to contents of news content included in the web page W10. In this way, the terminal device 100 can allow the user to easily recognize the advertising content, by displaying the web page and the advertising content in association with each other, the web page being supposed to be of immediate interest to the user. As a result, the terminal device 100 can improve the advertising effect of the advertising content to be displayed.

Further, the second display unit 146 displays advertising content that has relevancy to the web page, and prompts a moving operation of the web page. In other words, the second display unit 146 displays content that guides the user to display an end portion of the web page, by causing the user to repeat the scroll operation. Here, the end portion of the web page includes an end portion of a side of the web page, the side being not displayed at a stage of initial display. That is, the second display unit 146 displays advertising content that prompts movement to the end portion of the side not displayed at the stage of initial display, about the web page (the web page W10 in FIG. 1, for example) having the end portion not displayed on the output unit 130 of the terminal device 100 at the stage of initial display. In the example of FIG. 1, the second display unit 146 displays the advertising content C10 likened to a footprint walking downward on the web page W10. In this way, the terminal device 100 displays the advertising content that can provide the user with an incentive to further read the web page, on the web page that is supposed to be of immediate interest to the user. Accordingly, the terminal device 100 provides an advantage to a provider who provides the web page, and causes the user to browse the web page on which the advertising content is displayed, for a long time. Therefore, the degree of recognition of the advertising content can be improved.

Note that the processing executed by the detection unit 145 and the second display unit 146 is realized such that the control information included in the advertising content uses the function of the web browser that causes the terminal device 100 to display the web page W10.

6. Other Display Examples

Figure 7:
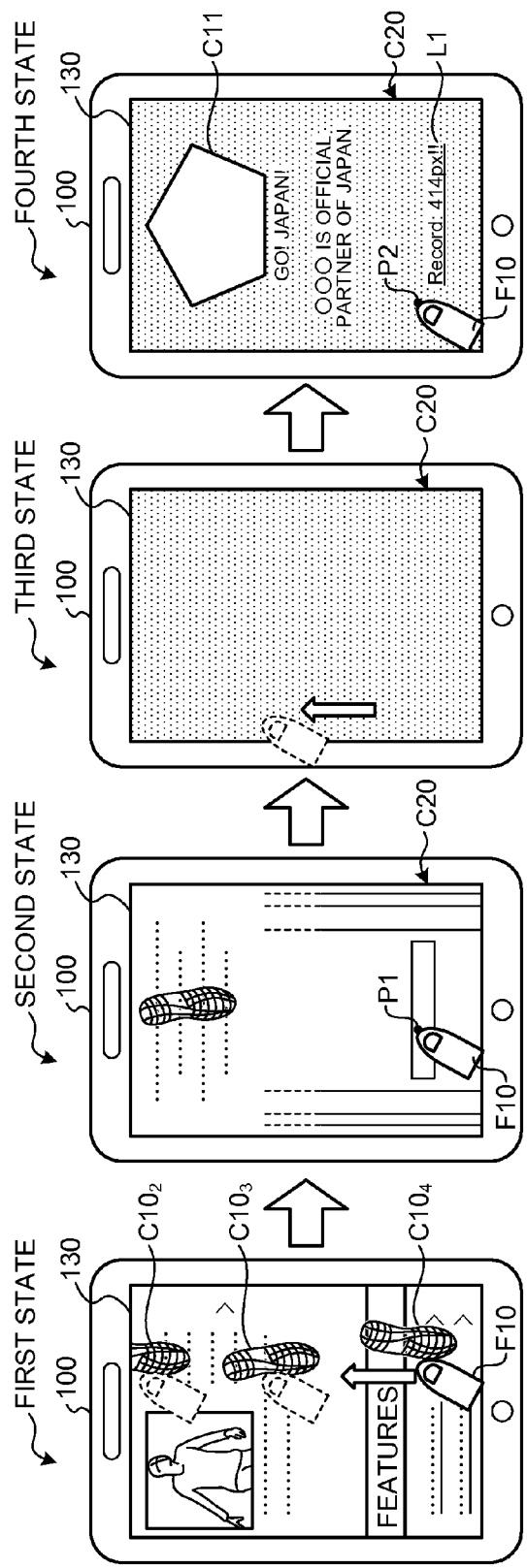
FIG. 7 is a diagram illustrating an example of display processing according to an embodiment.
Figure 8:
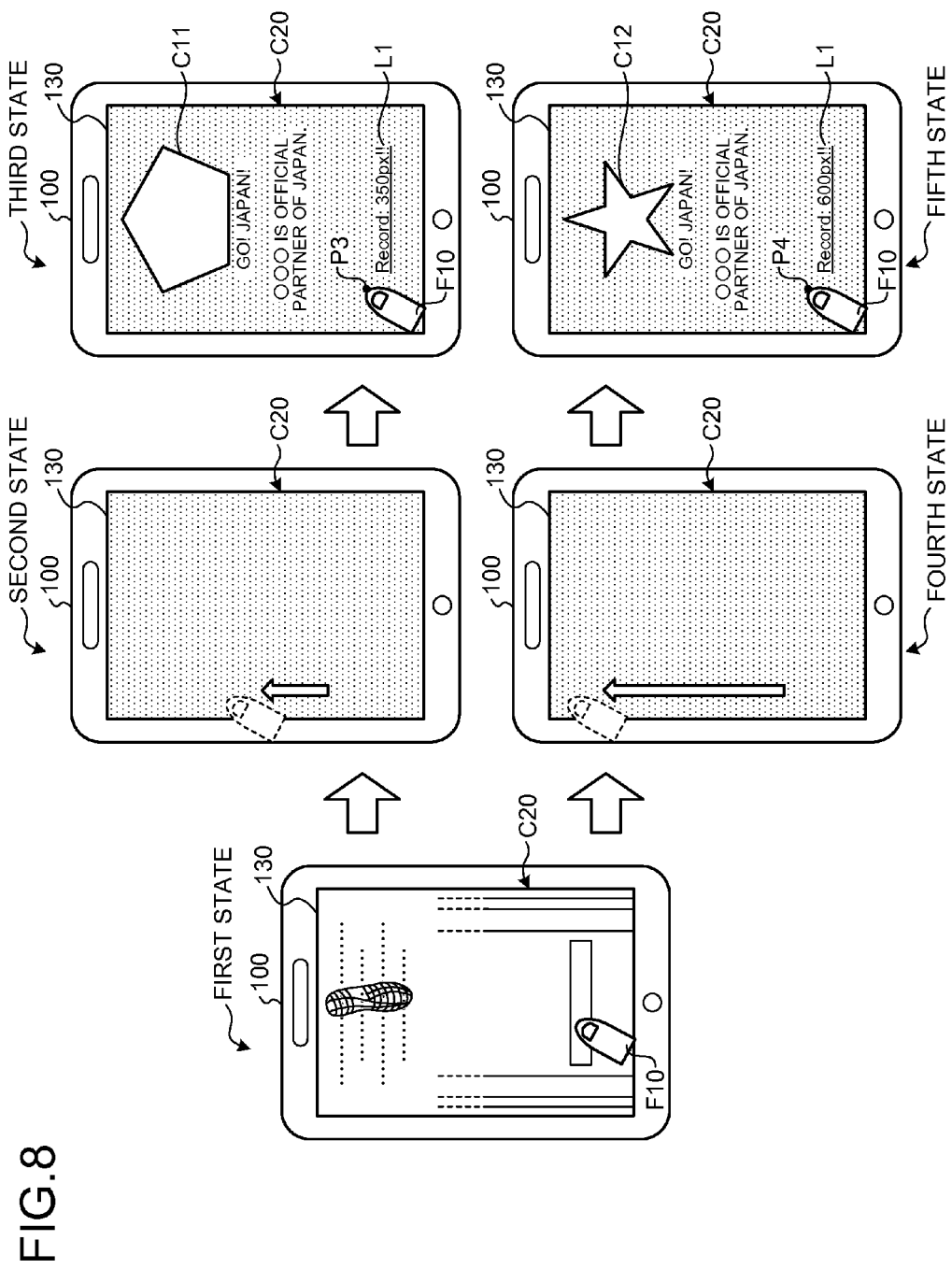
FIG. 8 is a diagram illustrating an example of display processing according to an embodiment.

In the above description, the display processing by the terminal device 100 has been described using the display form exemplarily illustrated in FIG. 1. To be specific, an example in which the terminal device 100 superimposes and displays the advertising content C10 on the web page W10, when having detected the scroll operation, has been described. Next, processing in which the terminal device 100 displays the advertising content C11 and C12 and the third content C20, in addition to the advertising content C10 will be described in more detail, using FIGS. 7 and 8. FIGS. 7 and 8 are diagrams illustrating an example of display processing according to an embodiment.

6-1. Another Example (1)

First, an example of FIG. 7 will be described. As illustrated in a first state of FIG. 7, the terminal device 100 displays the web page W10, similarly to the example of FIG. 1. The terminal device 100 then receives the scroll operation from the user, as illustrated in the first state of FIG. 7. The display processing by the terminal device 100 so far is similar to the example illustrated in FIG. 1.

Here, the web page W10 is moved to a vicinity of the end portion, by the scroll operation received from the user. That is, the terminal device 100 displays the vicinity of the end portion of the web page W10 in a second state of FIG. 7. Then, the second display unit 146 of the terminal device 100 displays the third content C20 in the end portion of the web page W10 when the web page W10 is moved to display the end portion of the web page W10. As illustrated in the second state of FIG. 7, content likened to a track of track and field is displayed, as a part of the third content C20, in the vicinity of the end portion of the web page W10.

The terminal device 100 then detects the scroll operation by the finger F10, in a vicinity of a position likened to a takeoff line in the content likened to the track of track and field. To be specific, in FIG. 7, the terminal device 100 detects that the finger F10 of the user has performed an operation to flick the surface of the output unit 130 after touching a point P1 in the vicinity of the position likened to the takeoff line.

Following that, the terminal device 100 moves the web page W10 according to the scroll operation received from the user. During the movement, as illustrated in a third state of FIG. 7, content likened to a landing pit used for long jump of track and field is displayed in the terminal device 100.

The terminal device 100 then detects a point P2 on the output unit 130 where the finger F10 first touches after touching the point P1. At this time, the terminal device 100 detects a distance between the point P1 and the point P2. In other words, the terminal device 100 detects a moved distance of the web page W10 associated with a transition from the second state of FIG. 7 to a fourth state of FIG. 7.

At this time, as illustrated in the fourth state of FIG. 7, the terminal device 100 newly displays the detected moved distance of the web page W10 on the displayed content likened to a landing pit. For example, as illustrated in the fourth state of FIG. 7, the terminal device 100 displays a moved distance display L1 that is a moved distance expressed by the number of pixels (px, pixel), like "Record: 414 px !!".

Further, the terminal device 100 displays the advertising content C11 together with the moved distance display L1. The advertising content C11 is a logo of the advertiser who has submitted the advertising content C10 and C11. Further, the terminal device 100 displays advertising contents such as "Go! Japan!" together with the advertising content C11.

As described above, the detection unit 145 of the terminal device 100 detects the moved distance of the web page W10 by the scroll operation, using the vicinity of the position that is the predetermined position in the web page W10 and is likened to the takeoff line of the track of track and field, as a starting point. The second display unit 146 of the terminal device 100 displays new advertising content C11 together with the moved distance detected by the detection unit 145. As described above, the third content C20 is content including the content likened to the track of track and field, the moved distance display L1, the advertising content C11, and the advertising contents such as "Go! Japan!". The terminal device 100 then displays the third content C20 including the moved distance display L1 and the advertising content C11, according to the scroll operation of the user. In other words, the terminal device 100 displays the moved distance display L1 and the advertising content C11, by appropriately changing the third content C20 that is an object to be displayed, according to the moved distance by which the web page W10 has been moved by the user.

Accordingly, the terminal device 100 provides the user with an entertainment aspect to the scroll operation itself. That is, the terminal device 100 sequentially displays the advertising content C10 likened to the sole of a shoe of sports shoes, and then displays the third content C20 including the content about the track of track and field that is conceptually linked to the sports shoes. Further, the terminal device 100 detects the moved distance of the scroll operation, using the vicinity of the position likened to the takeoff line of the track of track and field, as a starting point, and displays the moved distance according to the scroll operation of the user. In this way, the terminal device 100 can provide gaming properties to the operation, by presenting the result of the scroll operation as a record to the user. Therefore, the terminal device 100 can entertain the user with the scroll operation itself. Further, the terminal device 100 can provide the user with strong impression, by displaying the advertising content C11 and the advertising contents together with the display of the moved distance, and thus improves a branding effect by the advertising content.

6-2. Another Display Example (2)

Next, an example of FIG. 8 will be described. As illustrated in a first state of FIG. 8, the terminal device 100 displays the web page W10, similarly to the example of FIG. 7. The terminal device 100 then receives the scroll operation from the user, as illustrated in a second state of FIG. 8. The terminal device 100 then detects the moved distance of the web page W10 between the point P1 and a point P3, as illustrated in a third state of FIG. 8. Note that the moved distance of the web page W10 between the point P1 and the point P3 is "350" pixels. In this case, the moved distance display L1 is displayed as "Record: 350 px !!". The terminal device 100 then displays the third content C20 including the moved distance display L1 and the advertising content C11. The display processing by the terminal device 100 so far is similar to the example illustrated in FIG. 7.

Here, in the first state of FIG. 8, the terminal device 100 receives a stronger scroll operation than that received in the second state of FIG. 8. The strong scroll operation means that the user provides the web page W10 with a larger initial speed than the second state of FIG. 8, by quickly and largely moving the finger F10 on the output unit 130. A fourth state of FIG. 8 illustrates a state in which the terminal device 100 receives the strong scroll operation from the user.

In this case, the terminal device 100 that has received the strong scroll operation moves the web page W10 in a longer distance than the third state of FIG. 8. The terminal device 100 then detects a point P4 on the output unit 130 where the finger F10 first touches after touching the point P1, as illustrated in a fifth state of FIG. 8. At this time, the terminal device 100 detects a distance between the point P1 and the point P4. In other words, the terminal device 100 detects a moved distance of the web page W10 associated with a transition from the first state of FIG. 8 to the fifth state of FIG. 8.

Then, in the fifth state of FIG. 8, the terminal device 100 changes display of the third content C20 in which the content likened to the landing pit is displayed so that the advertising content C12 is displayed together with the moved distance display L1 of "Record: 600 px !!" that indicates the moved distance of web page W10. The advertising content C12 is a logo of the advertiser who submitted the advertising content C10, C11, and C12, and is a logo different from the advertising content C11. In this way, when the moved distance of the web page W10 is a predetermined threshold or more, the terminal device 100 displays the advertising content C12 instead of the advertising content C11. For example, assume that the predetermined threshold of the moved distance of the web page W10 is set to "500 pixels" in the control information acquired by the terminal device 100 together with the third content C20. In this case, the terminal device 100 displays the advertising content C11 if the detected moved distance is a value smaller than "500 pixels". Meanwhile, the terminal device 100 changes the third content C20 to display the advertising content C12 if the detected moved distance is a value of "500 pixels" or more.

Here, the advertising content C11 and C12 is the advertising content submitted from the same advertiser, but different link destinations may be provided. For example, the advertising content C11 is linked to the advertiser page that is the same as the case where the advertising content C10 is selected. Meanwhile, the advertising content C12 may be linked to access a different page from the advertising content C10 and C11. Then, the web page that is the access destination of the advertising content C12 is a web page through which the user can acquire a coupon or the like. Accordingly, the terminal device 100 can display content through which a different result can be obtained according to the moved distance recorded by the user.

As described above, the detection unit 145 of the terminal device 100 detects the moved distance of the web page W10 by the scroll operation. The second display unit 146 of the terminal device 100 changes the third content C20 to display the advertising content C11 and C12 corresponding to the moved distance detected by the detection unit 145.

Accordingly, the terminal device 100 provides the user with an incentive to repeat the scroll operation. That is, the terminal device 100 detects the moved distance of the scroll operation, and displays the moved distance according to the scroll operation of the user. Therefore, the terminal device 100 can prompts the user to repeat the scroll operation, who wishes to challenge to make a record of a better moved distance. Further, the terminal device 100 displays the advertising content C11 or C12 according to the moved distance. Accordingly, the terminal device 100 can cause the user to wish to display various types of advertising content. Therefore, the terminal device 100 can further prompt the user to repeat the scroll operation. As described above, the terminal device 100 can display the advertising content C11 and C12 a larger number of times, by causing the user to repeat the scroll operation, and thus can improve the branding effect of the advertiser with the advertising content C11 and C12.

Note that FIG. 8 illustrates an example in which the terminal device 100 displays the advertising content C11 and C12 according to the moved distance of the web page W10. However, the number of pieces or the type of advertising content to be displayed are not limited to the example. That is, the terminal device 100 may display another piece of content, in addition to the advertising content C11 or C12.

Further, FIGS. 7 and 8 illustrate an example in which the terminal device 100 displays the third content C20 including the content likened to the track of track and field, in the vicinity of the end portion of the web page W10. In this case, the third content C20 may be newly acquired from the content distribution server 30 or the advertising distribution server 20, upon the scroll to the end portion of the web page W10 by the user. That is, the detection unit 145 of the terminal device 100 detects that the web page W10 has been moved to the end portion by the scroll operation. The second display unit 146 of the terminal device 100 then newly displays the third content C20 in the advertising space R20 included in the web page W10, when the detection unit 145 has detected that the web page W10 has been moved to the end portion. Accordingly, the terminal device 100 can prevent display of the web page W10 having a space portion. That is, the third content C20 described in FIGS. 7 and 8 is usually displayed in a portion corresponding to an outside of the web page W10. Therefore, when the terminal device 100 has not yet acquired the third content C20, a space is displayed in a portion corresponding to an outside of the screen of the web page W10 (a region corresponding to the advertising space R20). Display of the space on the web page W10 may not be desirable for the user who browses the web page W10.

Therefore, the terminal device 100 enables the scroll operation to the portion outside the screen of the web page W10 only when acquiring the third content C20 as the content to be displayed in the advertising space R20.

7. Processing Flow of Advertising Distribution System

Figure 9:
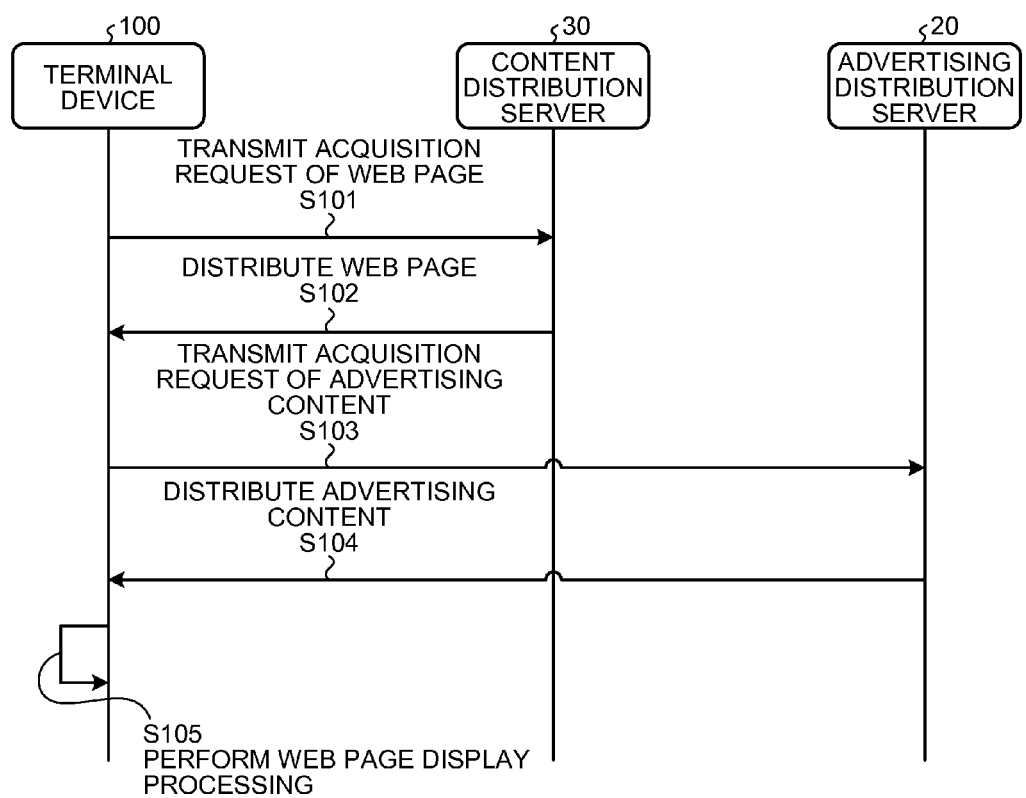
FIG. 9 is a sequence diagram illustrating a distribution processing procedure by an advertising distribution system according to an embodiment.

Next, a procedure of distribution processing by the advertising distribution system 1 according to an embodiment will be described using FIG. 9. FIG. 9 is a sequence diagram illustrating a distribution processing procedure by the advertising distribution system 1 according to an embodiment.

As illustrated in FIG. 9, the terminal device 100 transmits the acquisition request of the web page to the content distribution server 30 according to a user operation (step S101). The content distribution server 30 then distributes the web page to the terminal device 100 in response to the acquisition request of the web page (step S102). Note that the web page distributed by the content distribution server 30 includes the advertising acquisition command that is the URL of the advertising distribution server 20 and the like.

Following that, the terminal device 100 transmits the acquisition request of the advertising content to the advertising distribution server 20, based on the advertising acquisition command included in the web page (step S103). The advertising distribution server 20 then distributes the advertising content including the control information to the terminal device 100, in response to the acquisition request of the advertising content (step S104).

Then, the terminal device 100 performs the display processing of displaying the web page and the advertising content received in step S104, according to the control information included in the web page received in step S104 (step S105).

8-1. Processing Flow of Terminal Device (1)

Figure 10:
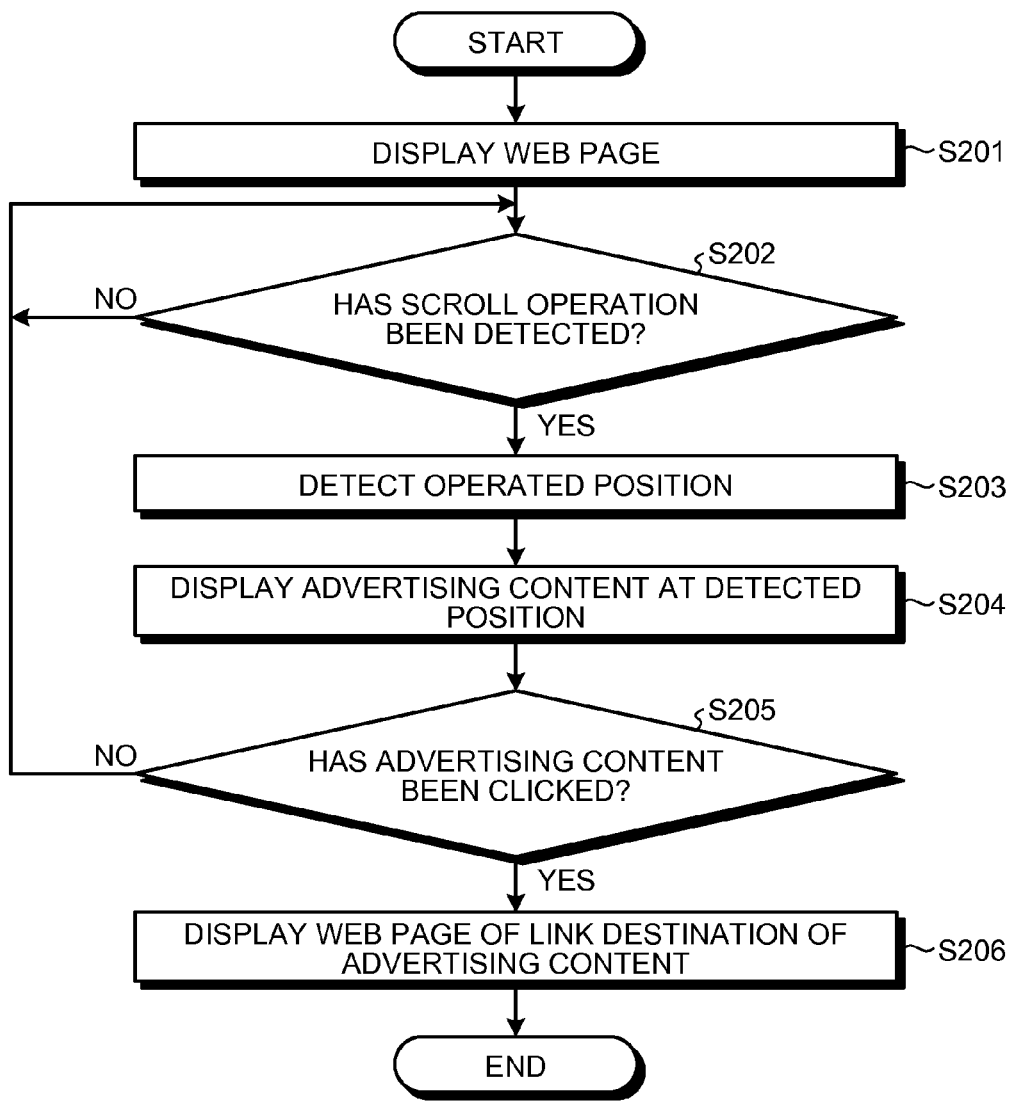
FIG. 10 is a flowchart illustrating a processing procedure by a terminal device according to an embodiment.
Figure 11:
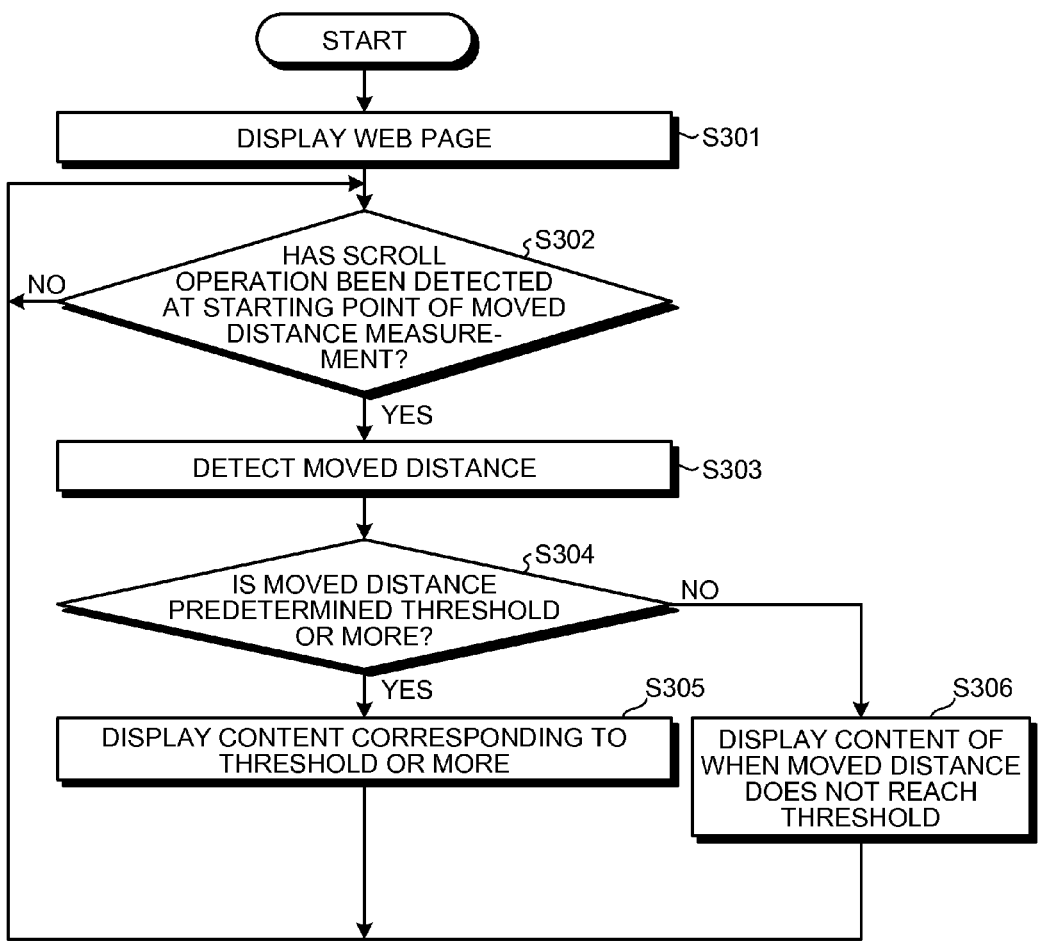
FIG. 11 is a flowchart illustrating a processing procedure by a terminal device according to an embodiment.

Next, a procedure of processing by the terminal device 100 according to an embodiment will be described using FIGS. 10 and 11. In FIG. 10, processing in which the terminal device 100 detects the position of the scroll operation, and displays the content at the detected position will be described. In FIG. 11, processing in which the terminal device 100 detects the moved distance of the web page by the scroll operation that is executed from a predetermined position, and displays the content corresponding to the detected moved distance will be described. First, FIG. 10 will be described. FIG. 10 is a flowchart illustrating a processing procedure by the terminal device 100 according to an embodiment.

As illustrated in FIG. 10, the terminal device 100 displays the web page acquired from the content distribution server 30 (step S201). The terminal device 100 then determines whether having received the scroll operation that is an example of a change operation of the web page from the user (step S202). When having not received the scroll operation (No in step S202), the terminal device 100 stands by for reception of the scroll operation.

Meanwhile, when having received the scroll operation (Yes in step S202), the terminal device 100 detects the position on the web page where the scroll operation has been performed by the user (step S203). The terminal device 100 then displays the advertising content at the detected position (step S204).

The terminal device 100 then determines whether the displayed advertising content has been clicked (step S205).

When the advertising content has not been clicked, the terminal device 100 does not perform new processing, and repeats the processing procedure of steps S202 to S205 (No in step S205).

Meanwhile, when the advertising content has been clicked (Yes in step S205), the terminal device 100 accesses the web page of the link destination of the advertising content, and displays the accessed web page (step S206).

8-2. Processing Flow of Terminal Device (2)

Next, FIG. 11 will be described. FIG. 11 is a flowchart illustrating a processing procedure by the terminal device 100 according to an embodiment.

As illustrated in FIG. 11, the terminal device 100 displays the web page acquired from the advertising distribution server 20 (step S301). The terminal device 100 then determines whether having detected the scroll operation in the starting point of the moved distance measurement, the starting point being positioned in the vicinity of the end portion of the web page (step S302). When having not received the scroll operation (No in step S302), the terminal device 100 stands by for reception of the scroll operation.

Meanwhile, when having received the scroll operation (Yes in step S302), the terminal device 100 detects the moved distance of the web page (step S303). The terminal device 100 then determines whether the moved distance of the web page is a predetermined threshold or more (step S304).

When having detected that the moved distance of the web page is the predetermined threshold or more (Yes in step S304), the terminal device 100 displays the content corresponding to the predetermined threshold or more (step S305).

Meanwhile, when having determined that the moved distance of the web page is not the predetermined threshold or more (No in step S304), the terminal device 100 displays the content of when the moved distance does not reach the predetermined threshold (step S306). Following that, the terminal device 100 repeatedly performs the processing procedure in steps S302 to S306.

9. Modification

The processing according to above-described embodiment may be implemented in various different forms other than the above-described embodiment. Hereinafter, other embodiments of the terminal device 100, the advertising distribution server 20, the content distribution server 30, and the advertising distribution system 1 will be described.

9-1. Display Processing Based on Time

In FIG. 1 with which the above embodiment has been described, an example in which the second display unit 146 of the terminal device 100 displays the advertising content $C10_1$ at the position where the scroll operation has been performed when the scroll operation is performed to the web page W10 has been described. Then, the example in which the terminal device 100 newly displays the advertising content $C10_2$ while displaying the advertising content $C10_1$, when the scroll operation has been newly performed after displaying the advertising content $C10_1$, has been described. Here, the terminal device 100 can hide advertising content $C10_1$ after elapse of a predetermined time after displaying the advertising content $C10_1$. This point will be described using FIG. 12.

Figure 12:
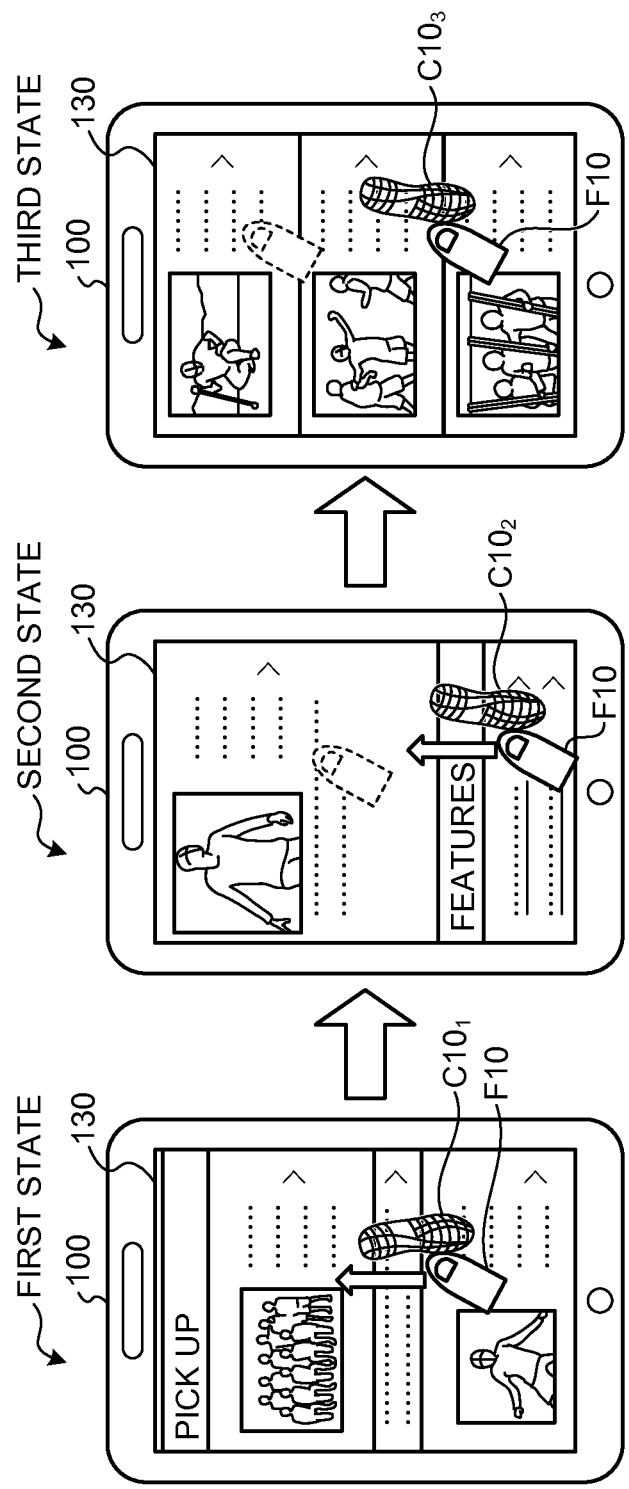
FIG. 12 is a diagram illustrating an example of display processing according to a modification.

FIG. 12 is a diagram illustrating an example of display processing according to a modification. A first state of FIG. 12 illustrates a state in which a web page W10 is moved upward by a finger F10. In the first state of FIG. 12, a terminal device 100 that has received a scroll operation from a user displays advertising content $C10_1$ at a position on the web page W10 where the scroll operation has been provided.

Then, in a second state of FIG. 12, when a predetermined time has elapsed after displaying the advertising content $C10_1$, the terminal device 100 hides the advertising content $C10_1$. Following that, when having received a new scroll operation by the finger F10, the terminal device 100 displays advertising content $C10_2$ at a position where the scroll operation has been received.

The terminal device 100 that has received the scroll operation in the second state of FIG. 12 then moves the web page W10 upward. Then, when a predetermined time has elapsed after displaying the advertising content $C10_2$, the terminal device 100 hides the advertising content $C10_2$. Following that, as illustrated in a third state of FIG. 12, the terminal device 100 displays advertising content $C10_3$ only at a position where the scroll operation has been lastly received.

As described above, the second display unit 146 of the terminal device 100 can hide the displayed advertising content C10 when a predetermined time has elapsed after displaying the advertising content C10.

Accordingly, the terminal device 100 can display the advertising content C10 without decreasing usability of the user who browses the web page W10. To be specific, the terminal device 100 hides the advertising content $C10_1$ when a predetermined time has elapsed after displaying the advertising content $C10_1$. Here, the user who has not operated the terminal device 100 for a fixed time is expected to have a possibility of browsing an article on the web page W10. Therefore, the terminal device 100 secures visibility of the user to the web page W10, by hiding the displayed advertising content C10. That is, the user can browse the web page W10 without a visual field being excessively interrupted by the advertising content C10. In this way, the terminal device 100 can cause the user to visually recognize the advertising content C10 without decreasing the usability.

9-2. Display Processing Based on Operation

In FIG. 12 with which the display processing has been described, an example in which the second display unit 146 of the terminal device 100 hides the advertising content C10 when a predetermined time has elapsed after displaying the advertising content C10 has been described. Here, the terminal device 100 may hide once-displayed advertising content C10 by another example.

For example, a terminal device 100 newly receives a scroll operation by a finger F10 after displaying advertising content $C10_1$. At this time, the terminal device 100 displays advertising content $C10_2$ at a position where the scroll operation has been newly received, and executes processing of hiding the advertising content $C10_1$. That is, the terminal device 100 may display the advertising content C10 only at the position where the scroll operation has been lastly received, without displaying a plurality of pieces of advertising content C10, on a web page W10.

As described above, a second display unit 146 of the terminal device 100 can hide the displayed advertising content C10 when the new scroll operation has been detected by a detection unit 145 after displaying the advertising content C10.

Accordingly, the terminal device 100 can display the advertising content C10 without decreasing usability of a user who browses the web page W10. That is, the terminal device 100 hides the advertising content $C10_1$ at timing when newly displaying the advertising content $C10_2$ after displaying the advertising content $C10_1$. Therefore, a plurality of pieces of advertising content C10 is not displayed on an output unit 130. Therefore, the user can browse the web page W10 without a visual field being excessively interrupted by the advertising content C10. As described above, the terminal device 100 can cause the user to visually recognize the advertising content C10 without decreasing the usability.

9-3. Control Information

In the advertising distribution system 1 according to the above-described embodiments, an example in which the advertising distribution server 20 distributes, to the terminal device 100, the control information for causing the terminal device 100 to execute the display processing together with the web page, has been described. However, a device that distributes the control information is not limited to the advertising distribution server 20, and may be a content distribution server 30.

In this case, a content distribution server 30 distributes control information to a terminal device 100 together with a web page that is an object to be distributed. The terminal device 100 performs the above-described display processing based on the control information. That is, whether a distribution source of the control information is the advertising distribution server 20 or the content distribution server 30 does not influence a result of the display processing performed by the terminal device 100. As described above, the terminal device 100 can perform the display processing regardless of the distribution source of the control information.

9-4. Form of Display Processing

In the above-described embodiment, an example in which the web page is vertically scrolled has been described. However, a form of display processing is not limited to the example. For example, the terminal device 100 may display a web page that can be horizontally scrolled, and execute display the processing according to the above-described embodiment when the web page is horizontally scrolled.

Further, in the above-described embodiment, an example of displaying the advertising content at the position on the web page where the scroll operation has been received has been described. However, the second display unit 146 may not necessarily display advertising content at the position on the web page where the scroll operation has been received, and may display the advertising content in a vicinity of the position where the scroll operation has been received, for example. Further, the second display unit 146 may display advertising content after elapse of a predetermined time without displaying the advertising content immediately after receiving the scroll operation. Accordingly, the terminal device 100 can secure visibility of the user in browsing of the web page.

9-5. Moving Operation

In the above-described embodiment, a case in which, the user touches the web page W10 for the scroll operation with the finger F10, and further performs the operation to flick the output unit 130 with the finger F10 has been described. Then, the case in which the terminal device 100 displays the advertising content C10 when the operation has been performed has been described. Here, the terminal device 100 may not display the advertising content C10 when having detected that the user has executed the operation to move the web page W10 without releasing the finger F10 from the output unit 130 for a scroll operation (the operation is a so-called swipe operation).

That is, when the user is performing the operation to move the web page without releasing the finger F10 from the web page, a state in which the user is slowly reading contents of an article included in the web page or the like is expected.

In this case, if the second display unit 146 displays advertising content C10, visibility of the user to the web page may be decreased, and is not desirable for the user. Therefore, the terminal device 100 can be caused not to execute the processing of displaying the advertising content C10 when the user is performing the operation to move the web page without releasing the finger F10 from the web page.

9-6. Reception of Operation

Further, when an input device other than a touch panel is employed as the terminal device 100, an operation with the input device corresponding to the above-described operation may be employed. For example, a flick operation with the finger F10 corresponds to a wheel scroll operation with a mouse that is an example of the input device. Further, as the input device that receives the flick operation with the finger F10, a track pad or the like may be used.

9-7. Operation Record of Terminal Device

Further, the above-described terminal device 100 may transmit a record of how much the user has operated the terminal device 100 for a web page on which advertising content according to an embodiment is displayed, to the advertising distribution server 20. To be specific, the detection unit 145 records the scroll operation performed by the user to the web page on which advertising content is displayed, enlarging/reducing operations of the web page, and the like. Further, the detection unit 145 can also record various operations performed by the user to the terminal device 100, such as a click operation to the advertising content, the number of times of reloading the web page, a sending operation from the terminal device 100 about information that identifies advertising content (for example, write to an SNS). The communication unit 110 then transmits information related to an operation history recorded by the detection unit 145 to the advertising distribution server 20.

The advertising distribution server 20 then receives the information related to an operation history of the terminal device 100 distributed from the terminal device 100. Further, the advertising distribution server 20 accumulates the received information related to an operation history of the terminal device 100, and further acquires information that is an analysis of the information. To be specific, the advertising distribution server 20 acquires the number of times of scroll operations, information of comparison of indexes of advertising effects such as a CTR, and the like, about advertising content associated with control information according to an embodiment and advertising content without being associated with the control information. Further, the advertising distribution server 20 may present, to an advertiser, information that indicates comparison of measured values of impression number, about the advertising content associated with control information according to an embodiment and advertising content without being associated with the control information. Accordingly, the advertising distribution server 20 can present, to the advertiser, usefulness of a display form of a web page associated with the control information according to an embodiment in the terminal device 100 (for example, an increase in the CTR due to improvement of visibility of advertising content).

9-8. Content on which Advertising Content is Displayed

In the above-described embodiment, an example in which the advertising content is superimposed and displayed on the web page has been described. However, a place on which advertising content is displayed is not limited to the web page. For example, the advertising content and the like may be displayed on a screen of a mobile phone game. Further, the terminal device 100 may execute the above-described processing about an arbitrary piece of content other than the advertising content.

9-9. Form of Content

In the above-described embodiment, an example in which the advertising content is a still image that mimics a sole of sports shoe or a logo of the advertiser as the advertising content related to the web page has been described. However, advertising content controlled and displayed with the above-described control information may include various forms of advertising content. For example, on a web page that introduces cosmetics, advertising content displayed when a user performs a scroll operation may be advertising content that mimics a nail polish. Further, on a web page that introduces nail arts, a nail art that is actually applied may be displayed as advertising content.

Further, in the above-described embodiment, an example of displaying the third content C20 including the content likened to the track of track and field has been described. However, the terminal device 100 may display a different form of content. For example, the terminal device 100 displays third content likened to a golf course. In this case, the terminal device 100 can provide a user with third content having gaming properties, which can be likened as if hitting a golf ball in the golf course, with a scroll operation of the user. Further, the terminal device 100 may display third content that appeals an increase in the amount of food, using scroll. Further, the terminal device 100 displays third content that mimics a map, and may provide third content likened as if being moved on the map, using scroll received from the user.

Note that, in the above-described embodiment, an example in which the terminal device 100 changes the third content C20 according to the detected moved distance, by detecting the moved distance of the web page W10, has been described. However, a value detected by the terminal device 100 is not limited to the moved distance. For example, the terminal device 100 may detect another value caused by an operation received from a user. To be specific, the terminal device 100 detects moving speed of a web page or acceleration of a web page. The terminal device 100 then may change third content according to the detected moving speed or acceleration of a web page. Further, the terminal device 100 may detect timing of a moving operation received from the user. For example, the terminal device 100 detects a frequency of the moving operation within a predetermined time. The terminal device 100 then may change the third content when having detected that the user is performing the moving operation to a web page at a frequency higher than a predetermined threshold or more. Alternatively, the terminal device 100 may change the third content when a temporal interval of the moving operation received from the user is a predetermined threshold or less (for example, when a several number of times of tap operations has been received in a short time). Further, when the third content is dynamic content, the terminal device 100 may detect timing of an operation received from the user. For example, when the third content is content having gaming properties, and the moving operation of the user is performed at timing matched with a predetermined operation required in the third content, the terminal device 100 detects the timing of the operation. The terminal device 100 then may change the third content according to the detected timing of the operation. That is, the detection unit 145 of the terminal device 100 detects the moved distance, the moving speed, or the acceleration of the web page by the moving operation, or the timing of the moving operation. The second display unit 146 of the terminal device 100 then changes the third content that is an object to be displayed, according to any one of the moved distance, the moving speed, and the acceleration of the web page, and the timing of the moving operation detected by the detection unit 145.

As described above, the terminal device 100 can improve the degree of recognition of the advertising content and can enhance an entertainment aspect of the user, by displaying various types of content related to the web page or the advertiser, and changing the displayed content.

Note that, in the above-described embodiment, the example of displaying the third content in the advertising space included in the web page has been described. However, the third content may be incorporated in a web page in advance, instead of being displayed in the advertising space. For example, the second display unit 146 superimposes and displays third content on an end portion of a web page. In this case, when having detected a predetermined scroll operation, the terminal device 100 may perform processing of newly displaying predetermined content (advertising content C11 and C12 in FIG. 8, for example) on the third content displayed in advance, instead of changing the third content.

9-10. Device Configuration

Further, in the above-described embodiment, an example in which the advertising distribution system 1 includes the content distribution server 30 and the advertising distribution server 20 has been described. However, the content distribution server 30 and the advertising distribution server 20 may be formed as one device. In this case, the content distribution server 30 illustrated in FIG. 3 includes an advertising content storage unit, separately from the content storage unit 32. The content distribution server 30 distributes a web page not including an advertising acquisition command to the terminal device 100 together with advertising content existing in the advertising content storage unit, when having received an acquisition request of a web page from the terminal device 100.

Further, in the above-described embodiment, an example in which the advertising content is distributed from the advertising distribution server 20 to the terminal device 100 has been described. However, the content distribution server 30 may acquire the advertising content from the advertising distribution server 20. In this case, the advertising distribution server 20 receives an acquisition request of advertising content from the content distribution server 30. Further, the advertising distribution server 20 distributes the advertising content to the content distribution server 30. Further, the distribution unit 35 of the content distribution server 30 distributes a web page not including an advertising acquisition command to the terminal device 100 together with the advertising content acquired from the advertising distribution server 20. In this case, the content distribution server 30 corresponds to a distribution device according to the present application.

9-11. Others

Further, a part or a whole of the processing described automatically performed, of the processing described in the above-described embodiment, can be manually performed. Further, a part or a whole of the processing described manually performed can be automatically performed by a known method. In addition, the processing procedure described in the above documents and illustrated in the drawings, the specific names, and the information including various data and parameters can be arbitrarily changed, unless otherwise specified. For example, the various types of information illustrated in the drawings are not limited to the illustrated information.

Further, the illustrated configuration elements of the devices are functional and conceptual examples, and need not necessarily configured as physically illustrated. That is, specific forms of distribution/integration of the devices are not limited to the illustrated examples, and a part of a whole of the devices can be configured in a functionally or physically distributed/integrated manner in an arbitrary unit, according to various loads and use circumstances. For example, the request unit 141 and the reception unit 142 illustrated in FIG. 6 may be integrated.

Further, the above-described embodiments can be appropriately combined within a range not causing inconsistencies in the processing contents.

9-12. Hardware Configuration

Figure 13:
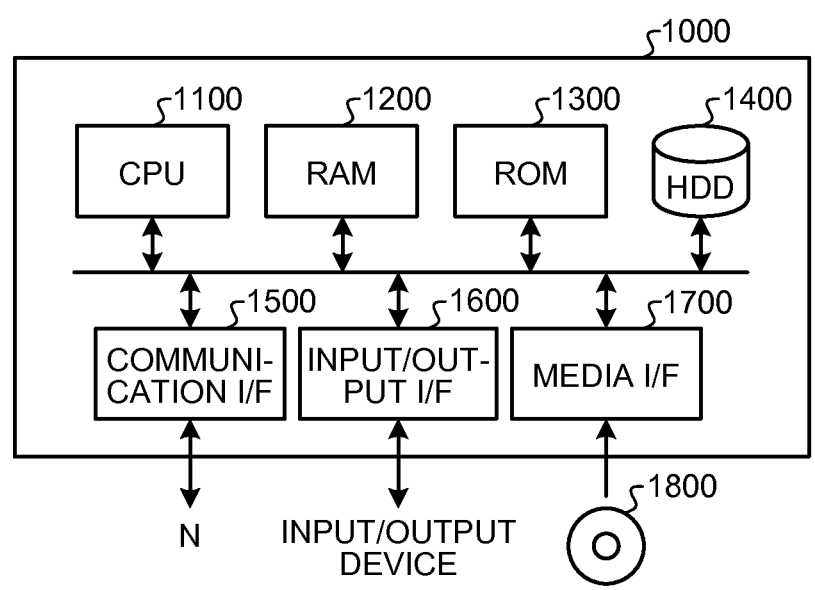
FIG. 13 is a hardware configuration diagram illustrating an example of a computer that realizes a function of a distribution device.

Further, the terminal device 100, the advertising distribution server 20, and the content distribution server 30 according to the above-described embodiments are realized by a computer 1000 having a configuration as illustrated in FIG. 13, for example. Hereinafter, the content distribution server 30 will be exemplarily described. FIG. 13 is a hardware configuration diagram illustrating an example of the computer 1000 that realizes the function of the content distribution server 30. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 is operated based on a program stored in the ROM 1300 or the HDD 1400, and controls respective units. The ROM 1300 stores a boot program executed by the CPU 1100 at the time of start of the computer 1000, a program depending on hardware of the computer 1000, and the like.

The HDD 1400 stores a program executed by the CPU 1100, data used by the program, and the like. The communication interface 1500 receives data from another device through a network N, sends the data to the CPU 1100, and transmits data generated by the CPU 1100 to another device through the network N.

The CPU 1100 controls an output device such as a display or a printer, and an input device such as a keyboard or a mouse, through the input/output interface 1600. The CPU 1100 acquires data from the input device through the input/output interface 1600. Further, the CPU 1100 outputs generated data to the output device through the input/output interface 1600.

The media interface 1700 reads a program or data stored in a recording medium 1800, and provides the read program or data to the CPU 1100 through the RAM 1200. The CPU 1100 loads the program from the recording medium 1800 to the RAM 1200 through the media interface 1700, and executes the loaded program. The recording medium 1800 is an optical recording medium such as a digital versatile disk (DVD) or a phase change rewritable disk (PD), a magneto-optical recording medium such as a magneto-optical disk (MO), a tape medium, a magnetic recording medium, or a semiconductor memory.

For example, when the computer 1000 functions as the content distribution server 30 according to an embodiment, the CPU 1100 of the computer 1000 realizes the function of the control unit 33 by executing the program loaded on the RAM 1200. Further, in the HDD 1400, data in the content storage unit 32 is stored. The CPU 1100 of the computer 1000 reads and executes these programs from the recording medium 1800. However, as another example, the CPU 1100 may acquire the programs from another device through the network N.

Note that, when the computer 1000 functions as the terminal device 100 according to an embodiment, the CPU 1100 of the computer 1000 realizes the function of the control unit 140 by executing the program loaded on the RAM 1200.

10. Effects

As described above, the advertising distribution server 20 according to an embodiment includes the distribution unit 28. The distribution unit 28 according to an embodiment distributes the control information that controls display of a web page (an example of first content) to the terminal device 100. Further, the control information according to an embodiment causes the terminal device 100 to execute the detection procedure of detecting the position where the moving operation to move the web page being displayed by the terminal device 100 has been performed, and the display procedure of superimposing and displaying advertising content (an example of second content) on the web page, based on the position detected by the detection procedure.

As described above, the advertising distribution server 20 according to an embodiment displays the advertising content based on the detected position, when having detected the moving operation of the web page from the user, in the terminal device 100. Accordingly, according to the advertising distribution server 20 of an embodiment, the advertising content can be displayed at a fingertip that can be easily focused by the user who operates the terminal device 100. Therefore, the advertising content can attract attention of the user. Therefore, the advertising distribution server 20 according to an embodiment can improve an advertising effect of the advertising content.

The display procedure according to an embodiment displays the advertising content that is advertising content, and allows an access to the predetermined content (the advertiser page, for example) corresponding to the advertising content when the advertising content is selected by the user of the terminal device 100.

As described above, according to the advertising distribution server 20 of an embodiment, the advertiser evoked from the advertising content can be instilled into the user, and an incentive for the user to access the advertiser page can be provided. Accordingly, the advertising distribution server 20 according to an embodiment can strongly impress the advertising content on the user, and thus improves the advertising effect of the advertising content.

Further, the display procedure according to an embodiment displays new advertising content while keeping display of the displayed advertising content, when a new moving operation has been detected by the detection procedure after displaying the advertising content.

According to the advertising distribution server 20 of an embodiment, a large number of pieces of advertising content can be recognized by the user, with the scroll operation. Accordingly, the advertising distribution server 20 of an embodiment impresses the advertising content on the user, and improves the branding effect of the advertising content.

Further, the display procedure according to an embodiment hides the displayed advertising content when a predetermined time has elapsed or when a new moving operation has been detected by the detection procedure, after displaying the advertising content.

As described above, the advertising distribution server 20 according to an embodiment secures visibility of the user to the web page, by hiding the advertising content displayed in the terminal device 100. Accordingly, the advertising distribution server 20 according to an embodiment can cause the user to visually recognize the advertising content C10 without decreasing usability.

Further, the display procedure according to an embodiment displays the advertising content having relevancy to the web page.

As described above, according to the advertising distribution server 20 of an embodiment displays the advertising having relevancy to the contents of the web page, and thus can display the advertising content having an appeal for the user. Accordingly, the advertising distribution server 20 according to an embodiment can improve the advertising effect of the advertising content.

Further, the display procedure according to an embodiment displays the advertising content that guides the user to display the end portion of the web page, as the advertising content.

As described above, according to the advertising distribution server 20 of an embodiment displays the advertising content that prompts the user to perform the moving operation of the web page. Accordingly, the advertising distribution server 20 can provide an advantage to the provider who provides the web page.

Further, the display procedure according to an embodiment displays the third content in the end portion of the web page, when the web page is moved to display the end portion.

As described above, according to the advertising distribution server 20 of an embodiment, the content that causes an entertainment aspect is displayed in the end portion of the web page. Accordingly, the advertising distribution server 20 can increase an interest of the user to the advertiser, by displaying the content having a new entertainment aspect in a region that is usually outside the screen.

Further, in the control information according to an embodiment, the detection procedure detects the moved distance of the web page by the moving operation, using the predetermined position determined in advance, as the starting point. The display procedure displays the content related to the advertiser of the advertising content together with the moved distance detected by the detection procedure, as the third content having an entertainment aspect that returns a result of the scroll operation of the user.

Accordingly, the advertising distribution server 20 according to an embodiment can also provide gaming properties to the operation, by presenting, to the user, a result of the scroll operation as a record, and thus can entertain the user with the scroll operation itself. According to the advertising distribution server 20 of an embodiment, the advertising content and the advertising contents are displayed together with display of the moved distance, and thus the branding effect with the advertising content can be improved.

Further, the display procedure according to an embodiment changes the third content that is an object to be displayed, according to at least any one of the moved distance, the moving speed, the acceleration, and the timing of the moving operation detected by the detection procedure.

Accordingly, the advertising distribution server 20 according to an embodiment can prompt the user who wishes to challenge making a record of a better moved distance to repeat the scroll operation. Further, the advertising distribution server 20 according to an embodiment displays various types of content related to the advertiser, according to the moved distance and the like, and thus can improve the branding effect of the advertiser.

As described above, some embodiments of the present application have been described in detail based on the drawings. However, these embodiments are mere examples, and the present invention can be implemented in other forms to which various modifications or improvements are applied based on the knowledge of a person skilled in the art, including the forms described in the disclosure of the invention.

Further, the above-described "portion (section, module, or unit)" can be read as "means" or "circuit". For example, the distribution unit can be read as distribution means or distribution circuit.

According to one aspect of an embodiment, an effect to improve an advertising effect of advertising content is exerted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A touch panel display screen control device comprising:
   a network interface; and
   a processor programmed to distribute, over a network, one or more advertisements and control information to a terminal device including a touch panel display screen, the control information, when received by the terminal device, causing a processor of the terminal device to:
   detect, via the touch panel display screen, a position of a swipe motion on the touch panel display screen; and
   when the swipe motion is detected on the touch panel display screen, control the touch panel display screen to:
   scroll, on the touch panel display screen, the primary content in a direction of the swipe motion such that a portion of the primary content having not been displayed on the touch panel display screen, is displayed on the touch panel display screen;
   display a first advertisement of the one or more advertisements superimposed on the primary content on the touch panel display screen at a location corresponding to the detected position of the swipe motion; and
   when a new swipe motion is detected on the touch panel display screen after the displaying of the first advertisement, further display a second advertisement of the one or more advertisements superimposed on the primary content on the touch panel display screen at a location corresponding to the detected position of the new swipe motion while keeping display of the displayed first advertisement, wherein each of the one or more advertisements includes a link to a webpage of a same advertiser.

2. The touch panel display screen control device according to claim 1, wherein:
   the link to the same webpage allows access to the same webpage, when the link to the same webpage is clicked or touched on the touch panel display screen by a user of the terminal device.

3. The touch panel display screen control device according to claim 1, wherein:
   the control information is configured to cause the terminal device to control the touch panel display screen to hide the displayed first advertisement when:
   a predetermined period of time has elapsed, or
   another new swipe motion has been detected by the terminal device after the second advertisement has been displayed.

4. The touch panel display screen control device according to claim 1, wherein:
   the one or more advertisements are relevant to the primary content.

5. The touch panel display screen control device according to claim 1, wherein:
   the one or more advertisements guide a user of the terminal device to repeat scroll operations so that an end portion of the primary content is displayed on the touch panel display screen.

6. The touch panel display screen control device according to claim 1, wherein:
   the control information is configured to cause the terminal device to control the touch panel display screen to display end content at an end portion of the primary content when the primary content is scrolled to display the end portion of the primary content.

7. The touch panel display screen control device according to claim 6, wherein the control information is configured to cause the terminal device to control the touch panel display screen to:
   detect a moved distance of the primary content by the swipe motion by using a predetermined position determined in advance as a starting point of the moved distance; and
   display the end content together with the detected moved distance.

8. The touch panel display screen control device according to claim 7, wherein the control information is configured to cause the terminal device to control the touch panel display screen to:
   detect the moved distance, a moving speed, or an acceleration of the primary content by the swipe motion, or a timing of the swipe motion; and
   change the end content that is an object to be displayed according to at least any one of the moved distance, the moving speed, the acceleration of the primary content by the swipe motion, and the timing of the detected swipe motion.

9. A terminal device comprising:
   a network interface configured to receive, over a network, one or more advertisements and control information from a touch panel display screen control device;
   a memory that stores the received one or more advertisements and the received control information;
   a touch panel display screen; and
   a processor programmed to execute the stored control information such that the touch panel display screen:
   detects a position of a swipe motion on the touch panel display screen; and
   when the swipe motion is detected on the touch panel display screen:
   scrolls the primary content in a direction of the swipe motion such that a portion of the primary content having not been displayed on the touch panel display screen, is displayed on the touch panel display screen; and
   displays a first advertisement of the one or more advertisements superimposed on the primary content on the touch panel display screen at a location corresponding to the detected position of the swipe motion; and
   when a new swipe motion is detected on the touch panel display screen after the displaying of the first advertisement, further display a second advertisement of the one or more advertisements superimposed on the primary content on the touch panel display screen at a location corresponding to the detected position of the new swipe motion while keeping display of the displayed first advertisement, wherein each of the one or more advertisements includes a link to a webpage of a same advertiser.

10. A computer-implemented touch panel display screen control method comprising:

distributing, over a network, one or more advertisements and control information to a terminal device including a touch panel display screen, the control information being configured to, when executed by the terminal device, cause the touch panel display screen to:

detect a position of a swipe motion on the touch panel display screen; and when the swipe motion is detected on the touch panel display screen:

scroll, on the touch panel display screen, the primary content in a direction of the swipe motion such that a portion of the primary content having not been displayed on the touch panel display screen, is displayed on the touch panel display screen;

display a first advertisement of the one or more advertisements superimposed on the primary content on the touch panel display screen at a location corresponding to the detected position of the swipe motion; and when a new swipe motion is detected on the touch panel display screen after the displaying of the first advertisement, further display a second advertisement of the one or more advertisements superimposed on the primary content on the touch panel display screen at a location corresponding to the detected position of the new swipe motion while keeping display of the displayed first advertisement, wherein each of the one or more advertisements includes a link to a webpage of a same advertiser.

11. A non-transitory computer readable storage medium having stored therein a touch panel display screen control distribution program, the touch panel display screen control distribution program comprising: computer-executable instructions that, when executed, cause a touch panel display screen control device to distribute, over a network, one or more advertisements and control information to a terminal device having a touch panel display screen, the control information, when received by the terminal device, controlling a processor of the terminal device to:

detect, via the touch panel display screen, a position of a swipe motion on the touch panel display screen; and when the swipe motion is detected on the touch panel display screen, control the touch panel display screen to:

scroll, on the touch panel display screen, the primary content in a direction of the swipe motion such that a portion of the primary content having not been displayed on the touch panel display screen, is displayed on the touch panel display screen;

display a first advertisement of the one or more advertisements superimposed on the primary content on the touch panel display screen at a location corresponding to the detected position of the swipe motion; and when a new swipe motion is detected on the touch panel display screen after the displaying of the first advertisement, further display a second advertisement of the one or more advertisements superimposed on the primary content on the touch panel display screen at a location corresponding to the detected position of the new swipe motion while keeping display of the displayed first advertisement, wherein each of the one or more advertisements includes a link to a webpage of a same advertiser.

* * * * *